US011997298B2

(12) United States Patent
Mahajan et al.

(10) Patent No.: US 11,997,298 B2
(45) Date of Patent: May 28, 2024

(54) SYSTEMS AND METHODS OF VIDEO DECODING WITH IMPROVED BUFFER STORAGE AND BANDWIDTH EFFICIENCY

(71) Applicant: QUALCOMM Incorporated, San Diego, CA (US)

(72) Inventors: Vikrant Mahajan, Dinanagar (IN); Sandeep Nellikatte Srivatsa, Bangalore (IN); Ashish Mishra, Bhubaneswar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/880,396

(22) Filed: Aug. 3, 2022

(65) Prior Publication Data
US 2024/0048742 A1   Feb. 8, 2024

(51) Int. Cl.
*H04N 19/44* (2014.01)
*H04N 19/423* (2014.01)
*H04N 19/80* (2014.01)

(52) U.S. Cl.
CPC ........... *H04N 19/44* (2014.11); *H04N 19/423* (2014.11); *H04N 19/80* (2014.11)

(58) Field of Classification Search
CPC ....... H04N 19/44; H04N 19/423; H04N 19/80
See application file for complete search history.

(56) References Cited

U.S. PATENT DOCUMENTS

| 2019/0394482 | A1* | 12/2019 | Joshi | H04N 19/117 |
| 2020/0145658 | A1* | 5/2020 | Chang | H04N 19/176 |
| 2020/0145697 | A1 | 5/2020 | Zhang et al. | |
| 2020/0314452 | A1 | 10/2020 | Zhang et al. | |

(Continued)

FOREIGN PATENT DOCUMENTS

JP   2008271068 A   11/2008

OTHER PUBLICATIONS

Han J., et al., "A Technical Overview of AV1", arxiv.org, Cornell University Library, 201 Olin Library Cornell University Ithaca, NY 14853, XP081876357, arXiv:2008.06091v2 [eess.IV] Feb. 8, 2021, pp. 1-25, section II.

(Continued)

*Primary Examiner* — Mohammed S Rahaman
(74) *Attorney, Agent, or Firm* — Polsinelli LLP

(57) ABSTRACT

Video decoding systems and techniques are described. A decoder reads first video data from a first block of a video frame. The decoder retrieves neighboring video data from a line buffer. The neighboring video data is from a neighboring block that neighbors the first block in the video frame. The decoder processes the first video data and the retrieved neighboring video data using a constrained directional enhancement filter (CDEF) to generate filtered first video data. The decoder upscales the filtered first video data using an upscaler to generate upscaled filtered first video data. The decoder upscales the retrieved neighboring video data using the upscaler to generate upscaled neighboring video data, for instance after generating the filtered first video data. The decoder processes the upscaled filtered first video data and the upscaled neighboring video data using a loop restoration (LR) filter to generate output video data.

31 Claims, 9 Drawing Sheets

(56) References Cited

U.S. PATENT DOCUMENTS

2021/0266604 A1    8/2021  Du et al.
2022/0303586 A1*   9/2022  Du .................... H04N 19/159

OTHER PUBLICATIONS

De Rivaz P., et al., "AV1 Bit Stream Decoding Process Specification", Jan. 8, 2019, 681 Pages, XP055730685, sections 7.4, 7.14-7.17.
International Search Report and Written Opinion—PCT/US2023/067498—ISA/EPO—Aug. 25, 2023.
Midtskogen S., et al., "The AV1 Constrained Directional Enhancement Filter (CDEF)", IEEE International Conference on Acoustics, Speech and Signal Processing (ICASSP), IEEE, Apr. 15, 2018, XP033401342, pp. 1193-1197.

* cited by examiner

|    | x0 | x1 | x2 | x3 | x4 | x5 | x6 | x7 | x8 | x9 | x10 | x11 | x12 | x13 | x14 | x15 |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| | 16 | 17 | 18 | 19 | 20 | 21 | 22 | 23 | 24 | 25 | 26 | 27 | 28 | 29 | 30 | 31 |
| | 32 | 33 | 34 | 35 | 36 | 37 | 38 | 39 | 40 | 41 | 42 | 43 | 44 | 45 | 46 | 47 |
| | 48 | 49 | 50 | 51 | 52 | 53 | 54 | 55 | 56 | 57 | 58 | 59 | 60 | 61 | 62 | 63 |
| | 64 | 65 | 66 | 67 | 68 | 69 | 70 | 71 | 72 | 73 | 74 | 75 | 76 | 77 | 78 | 79 |
| | 80 | 81 | 82 | 83 | 84 | 85 | 86 | 87 | 88 | 89 | 90 | 91 | 92 | 93 | 94 | 95 |
| | 96 | 97 | 98 | 99 | 100 | 101 | 102 | 103 | 104 | 105 | 106 | 107 | 108 | 109 | 110 | 111 |
| | 112 | 113 | 114 | 115 | 116 | 117 | 118 | 119 | 120 | 121 | 122 | 123 | 124 | 125 | 126 | 127 |
| | 128 | 129 | 130 | 131 | 132 | 133 | 134 | 135 | 136 | 137 | 138 | 139 | 140 | 141 | 142 | 143 |
| | 144 | 145 | 146 | 147 | 148 | 149 | 150 | 151 | 152 | 153 | 154 | 155 | 156 | 157 | 158 | 159 |
| | 160 | 161 | 162 | 163 | 164 | 165 | 166 | 167 | 168 | 169 | 170 | 171 | 172 | 173 | 174 | 175 |
| | 176 | 177 | 178 | 179 | 180 | 181 | 182 | 183 | 184 | 185 | 186 | 187 | 188 | 189 | 190 | 191 |
| | 192 | 193 | 194 | 195 | 196 | 197 | 198 | 199 | 200 | 201 | 202 | 203 | 204 | 205 | 206 | 207 |
| | 208 | 209 | 210 | 211 | 212 | 213 | 214 | 215 | 216 | 217 | 218 | 219 | 220 | 221 | 222 | 223 |
| | 224 | 225 | 226 | 227 | 228 | 229 | 230 | 231 | 232 | 233 | 234 | 235 | 236 | 237 | 238 | 239 |
| | 240 | 241 | 242 | 243 | 244 | 245 | 246 | 247 | 248 | 249 | 250 | 251 | 252 | 253 | 254 | 255 |

500

Horiz. Raster Scan. Order 510 (e.g., for reading, processing, and/or output)

FIG. 5A

|    | x0 | x1 | x2 | x3 | x4 | x5 | x6 | x7 | x8 | x9 | x10 | x11 | x12 | x13 | x14 | x15 |
|---|---|---|---|---|---|---|---|---|---|---|---|---|---|---|---|---|
| | 0 | 16 | 32 | 48 | 64 | 80 | 96 | 112 | 128 | 144 | 160 | 176 | 192 | 208 | 224 | 240 |
| | 1 | 17 | 33 | 49 | 65 | 81 | 97 | 113 | 129 | 145 | 161 | 177 | 193 | 209 | 225 | 241 |
| | 2 | 18 | 34 | 50 | 66 | 82 | 98 | 114 | 130 | 146 | 162 | 178 | 194 | 210 | 226 | 242 |
| | 3 | 19 | 35 | 51 | 67 | 83 | 99 | 115 | 131 | 147 | 163 | 179 | 195 | 211 | 227 | 243 |
| | 4 | 20 | 36 | 52 | 68 | 84 | 100 | 116 | 132 | 148 | 164 | 180 | 196 | 212 | 228 | 244 |
| | 5 | 21 | 37 | 53 | 69 | 85 | 101 | 117 | 133 | 149 | 165 | 181 | 197 | 213 | 229 | 245 |
| | 6 | 22 | 38 | 54 | 70 | 86 | 102 | 118 | 134 | 150 | 166 | 182 | 198 | 214 | 230 | 246 |
| | 7 | 23 | 39 | 55 | 71 | 87 | 103 | 119 | 135 | 151 | 167 | 183 | 199 | 215 | 231 | 247 |
| | 8 | 24 | 40 | 56 | 72 | 88 | 104 | 120 | 136 | 152 | 168 | 184 | 200 | 216 | 232 | 248 |
| | 9 | 25 | 41 | 57 | 73 | 89 | 105 | 121 | 137 | 153 | 169 | 185 | 201 | 217 | 233 | 249 |
| | 10 | 26 | 42 | 58 | 74 | 90 | 106 | 122 | 138 | 154 | 170 | 186 | 202 | 218 | 234 | 250 |
| | 11 | 27 | 43 | 59 | 75 | 91 | 107 | 123 | 139 | 155 | 171 | 187 | 203 | 219 | 235 | 251 |
| | 12 | 28 | 44 | 60 | 76 | 92 | 108 | 124 | 140 | 156 | 172 | 188 | 204 | 220 | 236 | 252 |
| | 13 | 29 | 45 | 61 | 77 | 93 | 109 | 125 | 141 | 157 | 173 | 189 | 205 | 221 | 237 | 253 |
| | 14 | 30 | 46 | 62 | 78 | 94 | 110 | 126 | 142 | 158 | 174 | 190 | 206 | 222 | 238 | 254 |
| | 15 | 31 | 47 | 63 | 79 | 95 | 111 | 127 | 143 | 159 | 175 | 191 | 207 | 223 | 239 | 255 |

520

Vert. Raster Scan. Order 530 (e.g., for reading, processing, and/or output)

FIG. 5B

SYSTEMS AND METHODS OF VIDEO DECODING WITH IMPROVED BUFFER STORAGE AND BANDWIDTH EFFICIENCY

FIELD

This application is related to video decoding and decompression. More specifically, this application relates to systems and methods of performing improved video decoding that reduce how much storage space is needed for a neighboring block buffer, that reduce redundancy of upscaler elements, and that improve bandwidth and efficiency.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, cellular or satellite radio telephones, mobile phones (e.g., so-called "smart phones"), video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. The large amount of video data needed to meet these demands places a burden on communication networks and devices that process and store the video data.

Digital video devices can implement video coding techniques to compress video data. Video coding can be performed according to one or more video codecs and/or coding formats. For example, video codecs and/or coding formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. A goal of video decoding techniques is to recreate the original video data as closely as possible from the compressed video data. With ever-evolving video services becoming available, coding and decoding techniques with improved coding and decoding efficiencies are needed.

BRIEF SUMMARY

Systems and techniques are described for video decoding. In some examples, a decoder reads first video data from a first block of a video frame. The decoder retrieves neighboring video data from a line buffer. The neighboring video data is from a neighboring block that neighbors the first block in the video frame. The decoder processes the first video data and the retrieved neighboring video data using a constrained directional enhancement filter (CDEF) to generate filtered first video data. The decoder upscales the filtered first video data using an upscaler to generate upscaled filtered first video data. The decoder upscales the retrieved neighboring video data using the upscaler to generate upscaled neighboring video data, for instance after generating the filtered first video data. The decoder processes the upscaled filtered first video data and the upscaled neighboring video data using a loop restoration (LR) filter to generate output video data.

In one example, an apparatus for media processing is provided. The apparatus includes a memory and one or more processors (e.g., implemented in circuitry) coupled to the memory. The one or more processors are configured to and can: read first video data from a first block of a video frame; retrieve neighboring video data from a line buffer, wherein the neighboring video data is from a neighboring block that neighbors the first block in the video frame; process the first video data and the neighboring video data using a constrained directional enhancement filter (CDEF) to generate filtered first video data, wherein the neighboring video data that is used by the CDEF is retrieved from the line buffer; upscale the filtered first video data using an upscaler to generate upscaled filtered first video data; upscale the neighboring video data retrieved from the line buffer using the upscaler to generate upscaled neighboring video data; and process the upscaled filtered first video data and the upscaled neighboring video data using a loop restoration (LR) filter to generate output video data.

In another example, a method of image processing is provided. The method includes: reading first video data from a first block of a video frame; retrieving neighboring video data from a line buffer, wherein the neighboring video data is from a neighboring block that neighbors the first block in the video frame; processing the first video data and the neighboring video data using a constrained directional enhancement filter (CDEF) to generate filtered first video data, wherein the neighboring video data that is used by the CDEF is retrieved from the line buffer; upscaling the filtered first video data using an upscaler to generate upscaled filtered first video data; upscaling the neighboring video data retrieved from the line buffer using the upscaler to generate upscaled neighboring video data; and processing the upscaled filtered first video data and the upscaled neighboring video data using a loop restoration (LR) filter to generate output video data.

In another example, a non-transitory computer-readable medium is provided that has stored thereon instructions that, when executed by one or more processors, cause the one or more processors to: read first video data from a first block of a video frame; retrieve neighboring video data from a line buffer, wherein the neighboring video data is from a neighboring block that neighbors the first block in the video frame; process the first video data and the neighboring video data using a constrained directional enhancement filter (CDEF) to generate filtered first video data, wherein the neighboring video data that is used by the CDEF is retrieved from the line buffer; upscale the filtered first video data using an upscaler to generate upscaled filtered first video data; upscale the neighboring video data retrieved from the line buffer using the upscaler to generate upscaled neighboring video data; and process the upscaled filtered first video data and the upscaled neighboring video data using a loop restoration (LR) filter to generate output video data.

In another example, an apparatus for image processing is provided. The apparatus includes: means for reading first video data from a first block of a video frame; means for retrieving neighboring video data from a line buffer, wherein the neighboring video data is from a neighboring block that neighbors the first block in the video frame; means for processing the first video data and the neighboring video data using a constrained directional enhancement filter (CDEF) to generate filtered first video data, wherein the neighboring video data that is used by the CDEF is retrieved from the line buffer; means for upscaling the filtered first video data using an upscaler to generate upscaled filtered first video data; means for upscaling the neighboring video data retrieved from the line buffer using the upscaler to generate upscaled neighboring video data; and means for processing the upscaled filtered first video data and the upscaled neighboring video data using a loop restoration (LR) filter to generate output video data.

In some aspects, the neighboring video data is upscaled after generating the filtered first video data.

In some aspects, one or more of the methods, apparatuses, and computer-readable medium described above further comprise: filtering the first video data using a de-blocking (DB) filter to read the first video data, wherein the neighboring video data is filtered using the DB filter prior to retrieval of the neighboring video data from the line buffer.

In some aspects, one or more of the methods, apparatuses, and computer-readable medium described above further comprise: before retrieving the neighboring video data from the line buffer, reading the neighboring video data from the neighboring block of the video frame; and before retrieving the neighboring video data from the line buffer, storing the neighboring video data in the line buffer. In some aspects, one or more of the methods, apparatuses, and computer-readable medium described above further comprise: before storing the neighboring video data in the line buffer, filtering the first video data and the neighboring video data using a de-blocking (DB) filter. In some aspects, the neighboring video data is non-upscaled as retrieved from the line buffer.

In some aspects, reading the first video data and retrieving the neighboring video data includes reading the first video data and retrieving the neighboring video data in vertical raster scan order. In some aspects, the neighboring video data that is retrieved from the line buffer includes a portion of one or more lines of pixels that corresponds to one or more columns along vertical raster scan order, wherein a width of the portion of the one or more lines of pixels is less than an entire width of the first block.

In some aspects, one or more of the methods, apparatuses, and computer-readable medium described above further comprise: setting an indication for the first video data, wherein the indication is retained in the filtered first video data, the upscaled filtered first video data, and the output video data; and identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video. In some aspects, one or more of the methods, apparatuses, and computer-readable medium described above further comprise: setting an indication for the neighboring video data, wherein the indication is retained during processing using the CDEF, in the upscaled neighboring video data, and in the output video data; and identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

In some aspects, one or more of the methods, apparatuses, and computer-readable medium described above further comprise: duplicating at least one line of pixels in the upscaled neighboring video data to generate modified upscaled neighboring video data; and responsive to generating the modified upscaled neighboring video data, processing the upscaled filtered first video data and the upscaled neighboring video data using the LR filter to generate the output video data.

In some aspects, the neighboring block is located above the first block in the video frame.

In some aspects, the neighboring video data includes 4×W pixels, wherein W is a tile width corresponding to at least one tile of the video frame. In some aspects, a memory bandwidth of the line buffer is 4×W×F pixels per second, wherein W is a tile width corresponding to at least one tile of the video frame, wherein F is a frame rate associated with a video, wherein the video includes the video frame.

In some aspects, the CDEF, the upscaler, and the LR filter are associated with an AOMedia Video 1 (AV1) format.

In some aspects, one or more of the methods, apparatuses, and computer-readable medium described above further comprise: outputting the output video data for storage in at least one memory. In some aspects, one or more of the methods, apparatuses, and computer-readable medium described above further comprise: causing the output video data to be displayed using a display. In some aspects, one or more of the methods, apparatuses, and computer-readable medium described above further comprise: causing the output video data to be transmitted to a recipient device using a communication interface.

In some aspects, the first video data and the neighboring video data are encoded using a video encoder before the first video data is read and the neighboring video data is retrieved.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 5A is a conceptual diagram illustrating reading, processing, and/or outputting pixel data from a block according to a horizontal raster scanning order, in accordance with some examples;

FIG. 5B is a conceptual diagram illustrating reading, processing, and/or outputting pixel data from a block according to a vertical raster scanning order, in accordance with some examples;

DETAILED DESCRIPTION

Figure 1:
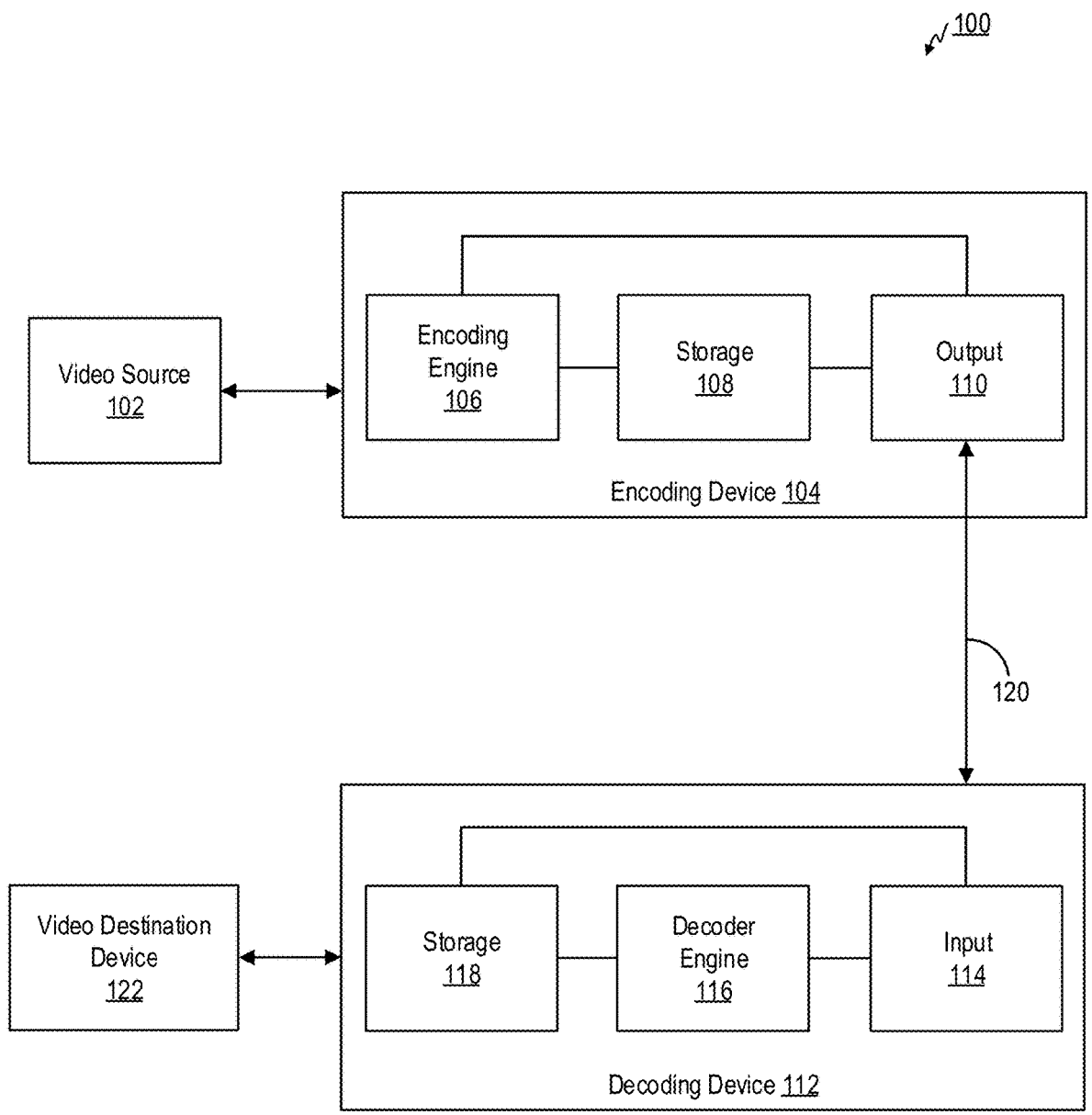
FIG. 1 is a block diagram illustrating an example of a system including an encoding device and a decoding device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction error can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

The AV1 video codec/format specifies a decoder that decodes video data by passing the video data through a deblocking (DB) filter, then a constrained directional enhancement filter (CDEF), and then a loop restoration (LR) filter, in that order. The DB filter and the CDEF filter both process video data at an original resolution of the video data as received by the decoder. However, the LR filter is configured to filter upscaled video data, so video data is upscaled first before it is passed to the LR filter.

When decoding video data corresponding to a particular block of video data, the decoder uses data from that block as well as data from at least one neighboring block as inputs. For instance, the decoder can receive first video data from a first block of a video frame and neighboring video data from a neighboring block of the video frame that neighbors the first block. The decoder can process both the first video data and the neighboring video data using the DB filter.

A decoder under the AV1 codec/format can store two instances of the neighboring video data in a line buffer corresponding to the neighboring block. A first instance of the neighboring video data that the decoder stores in the line buffer is stored as processed by the DB filter, with no further changes. A second instance of the neighboring video data that the decoder stores in the line buffer is upscaled by a first upscaling module after being processed by the DB filter before being stored. This storage of two instances of the neighboring video data in the line buffer can be inefficient in terms of storage space. For instance, this storage of two instances of the neighboring video data in the line buffer can require the line buffer to be large enough to store both instances of the neighboring video data. This storage of two instances of the neighboring video data in the line buffer can also be inefficient in terms of time, as it can require two write operations to the line buffer. This storage of two instances of the neighboring video data in the line buffer can also be inefficient in terms of bandwidth, as it can require a decoder to use components that have a higher read and/or write bandwidth to read and/or write both instances in time, rather than components that have a lower read and/or write bandwidth and may be more power-efficient.

In some examples, in a decoder under the AV1 codec/format, the CDEF filter processes the first video data by receiving, as inputs, the first video data from the DB filter and the first (non-upscaled) instance of the neighboring video data from the line buffer. The example decoder passes the CDEF-filtered first video data to a neighboring upscaling module to generate upscaled CDEF-filtered first video data. The neighboring upscaling module passes the upscaled CDEF-filtered first video data to the LR filter. The inclusion of two separate upscaling modules (the first upscaling module that upscales the neighboring instance of the neighboring video data for storage in the line buffer and the second upscaling module that upscales the CDEF-filtered first video data) is inefficient in terms of using additional hardware space for redundant functionality. In an example decoder under the AV1 codec/format, the LR filter processes the first video data to generate output video data by receiving, as inputs, the upscaled CDEF-filtered first video data from the second upscaling module and the second (upscaled) instance of the neighboring video data from the line buffer.

The systems and methods described herein describe a decoder. In the decoder, one instance of the neighboring video data is stored in the line buffer after the processing by the DB filter. This improves efficiency over other decoders, as the line buffer can be smaller, only one write operation is required to write the neighboring video data to the line buffer, and components with lower bandwidth (and therefore improved power efficiency) can be used. The neighboring video data is not upscaled before being stored in the line buffer, further reducing the space needed to store the neighboring video data in the line buffer.

The decoder includes one upscaling module, in between the CDEF filter and the LR filter. The decoder can apply a first indication to the first video data and a second indication to the neighboring video data. These indications can persist through DB filtering, CDEF filtering, upscaling, and/or LR filtering. This way, once the CDEF filter generates the CDEF-filtered first video data based on the first video data and the neighboring video data from the line buffer, the CDEF filter can pass all of its data (the CDEF-filtered first video data and the neighboring video data) to the upscaling module, which can upscale all of this video data while retaining these indications. The LR filter then receives all of this upscaled video data, processes it, and outputs it, with the indications still indicating which output data is from the first block and which output data is from the neighboring block. The decoder can use the output data corresponding to the first block as part of a decoded video.

In some examples, the neighboring block is vertically above the first block. If the decoder processes the video data within the first block and/or the neighboring block in the traditional horizontal raster scan order (left to right, from top row to bottom row), the decoder can end up having to store entire row(s) of the neighboring block in the line buffer. However, if the decoder instead processes the video data within the first block and/or the neighboring block in the vertical raster scan order (top to bottom, from left column to right column), then the decoder can store smaller portions of the row(s) of the neighboring block in the line buffer at any given time, for instance one or more blocks at a time. This can further improve efficiency and reduce how much space is needed in the line buffer.

In some examples, the CDEF filter uses video data from the two rows of the neighboring block that are closest to the first block. In some examples, the LR filter uses video data from the three rows of the neighboring block that are closest to the first block. In some examples, the decoder can store video data from the two rows of the neighboring block that are closest to the first block in the line buffer. The decoder can duplicate the video data from the neighboring row of the neighboring block to function as a third row for the LR filter. This can further improve efficiency and reduce how much space is needed in the line buffer.

With these improvements, in some examples, a minimum size for the line buffer can be reduced by 66.67%, a read/write bandwidth for the components of the line buffer can be reduced by 66.67%, and the amount of writes to the line buffer can be reduced from 2 to 1.

Video decoding systems and techniques are described. A decoder reads first video data from a first block of a video frame. The decoder retrieves neighboring video data from a line buffer. The neighboring video data is from a neighboring block that neighbors the first block in the video frame. The decoder processes the first video data and the retrieved neighboring video data using a constrained directional enhancement filter (CDEF) to generate filtered first video data. The decoder upscales the filtered first video data using an upscaler to generate upscaled filtered first video data. The decoder upscales the retrieved neighboring video data using the upscaler to generate upscaled neighboring video data, for instance after generating the filtered first video data. The decoder processes the upscaled filtered first video data and the upscaled neighboring video data using a loop restoration (LR) filter to generate output video data.

Various aspects of the application will be described with respect to the figures. FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video codecs and/or coding formats for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable codecs and/or coding formats already available or not yet available or developed. Accordingly, while the techniques and systems described herein may be described with reference to a particular video coding standard, one of ordinary skill in the art will appreciate that the description should not be interpreted to apply only to that particular standard.

Many embodiments described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

Two classes of Network Abstraction Layer (NAL) units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2:
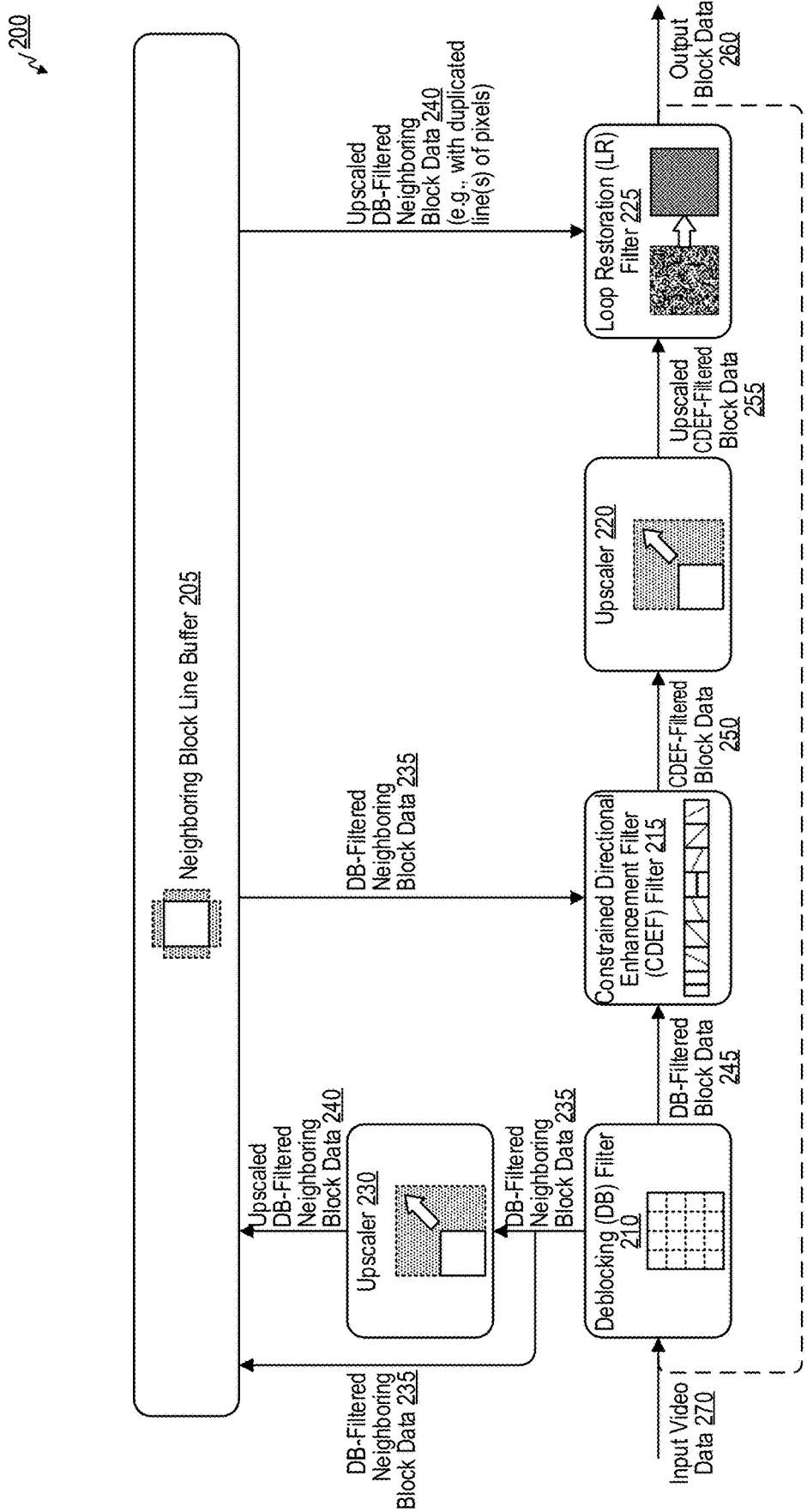
FIG. 2 is a block diagram illustrating a decoder system that includes two upscalers and that stores both deblocking (DB) filtered neighboring block data and upscaled DB-filtered neighboring block data in a neighboring block line buffer, in accordance with some examples.

FIG. 2 is a block diagram illustrating a decoder system 200 that includes two upscalers and that stores both deblocking (DB) filtered neighboring block data 235 and upscaled DB-filtered neighboring block data 240 in a neighboring block line buffer 205. The two upscalers include upscaler 220 and upscaler 230. The decoder system 200 may be an example of the decoding device 112 and/or the decoder engine 116.

Figure 4:
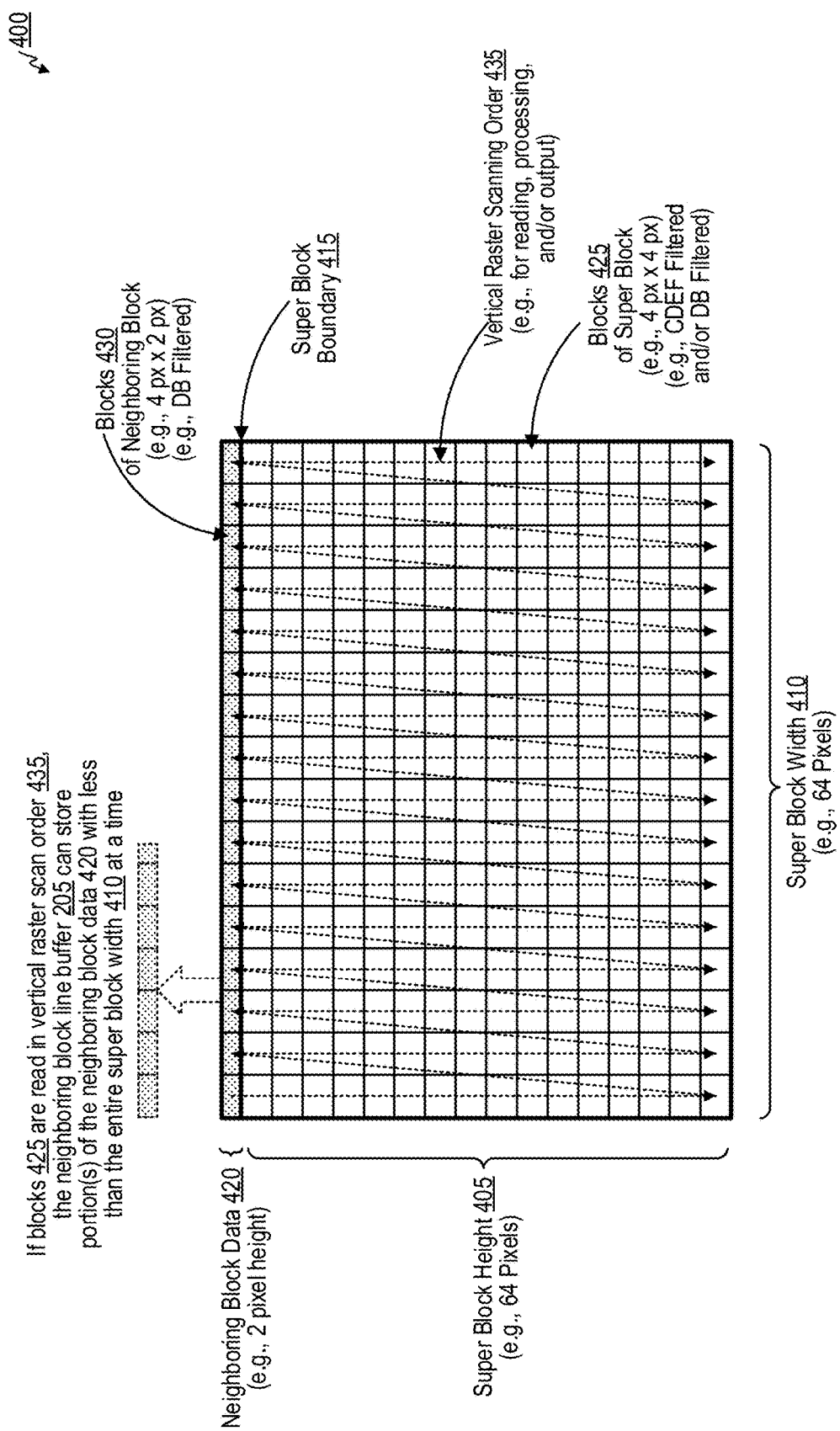
FIG. 4 is a conceptual diagram illustrating reading, processing, and/or outputting pixel data from a superblock and a neighboring block according to a vertical raster scanning order, in accordance with some examples.

The decoder system 200 receives input video data 270. The input video data 270 may be encoded using an encoder, such as the encoding device 104 and/or the encoding engine 106. The encoded video data 270 may include, for example, the encoded video bitstream data (e.g., the NAL units) discussed with respect to the output 110 of the encoding device 104 and/or the input 114 of the decoding device 112. The decoder system 200 inputs the input video data 270 into a de-blocking (DB) filter 210. In some examples, the input video data 270 may be at least partially decoded and/or processed by the decoder system 200 (and/or another aspect of the decoding device 112 and/or the decoder engine 116) by the time the decoder system 200 inputs the input video data 270 into the DB filter 210. For instance, the decoder system 200 (and/or another aspect of the decoding device 112 and/or the decoder engine 116) can have already been processed using an inverse discrete cosine transform (IDCT). The input video data 270 includes pixel data from a first block of a video frame, as well as pixel data from a neighboring block of the video frame. The neighboring block can be located adjacent to the first block within the context of the video frame. In some examples, the neighboring block is located above the first block within the context of the video frame (e.g., as illustrated in FIG. 4). In some examples, the neighboring block is located beside (e.g., to the left of or to the right of) the first block within the context of the video frame. In some examples, the neighboring block is located below the first block within the context of the video frame. In some examples, the first block and/or the neighboring block can be superblocks, macroblocks, and/or tiles.

The decoder system 200 uses the DB filter 210 to filter the input video data 270 to remove bordering artifacts at the edges of coded blocks (e.g., boundary discontinuities), for example by smoothing block edge artifacts away. In some examples, to filter the input video data 270 using the DB filter 210, the decoder system 200 can analyze the input video data 270 using one or more heuristic-based analysis to determine differences between bordering artifacts and legitimate details in video data at block edges, and control conditional application of smoothing at block edges. In some examples, the heuristic-based analysis can consider changes in luminosity at and/or across block edges, changes in specific color channels (e.g., red, green, and/or blue) at and/or across block edges, whether the block edges are internal to a larger block (e.g., superblock, macroblock, and/or tile) or at one or more edges of the larger block, any coded residuals present for the block, any block motion data (e.g., motion vectors) associated with the block, any block motion compensation data associated with the block, or a combination thereof. A graphic representing the DB filter 210 in FIG. 2 illustrates block edges using dotted lines, to represent smoothing of visual artifacts at such block edges to make the block edges less prominent when the video frame is viewed as a whole.

By filtering the input video data 270, the DB filter 210 generates DB-filtered block data 245 corresponding to the first block, and DB-filtered neighboring block data 235 corresponding to the neighboring block. The decoder system 200 passes the DB-filtered block data 245 from the DB filter 210 to a constrained directional enhancement filter (CDEF) 215. The decoder system 200 stores the DB-filtered neighboring block data 235 in a neighboring block line buffer 205. The decoder system 200 also passes the DB-filtered neighboring block data 235 to an upscaler 230 to generate upscaled DB-filtered neighboring block data 240 using the upscaler 230. The decoder system 200 stores the upscaled DB-filtered neighboring block data 240 in the neighboring block line buffer 205. The upscaler 230 upscales the DB-filtered neighboring block data 235 by an upscaling factor to generate the upscaled DB-filtered neighboring block data 240. In an illustrative example, the upscaling factor is 2. In some examples, the upscaling factor can be an integer value (e.g., 1, 2, 3, 4, etc.), a non-integer value (e.g., 1.0625, 1.125, 1.25, 1.5, 1.75, etc.), or another appropriate upscaling factor. A graphic representing the upscaler 230 in FIG. 2 illustrates upscaling of a block by a factor of 2.

The decoder system 200 can filter the DB-filtered block data 245 using the CDEF filter 215 to generate CDEF-filtered block data 250. To filter the DB-filtered block data 245 using the CDEF filter 215, the decoder system 200 can also retrieve the DB-filtered neighboring block data 235 from the neighboring block line buffer 205, and use the DB-filtered neighboring block data 235 as well as the DB-filtered block data 245 as inputs to the CDEF filter 215 to generate the CDEF-filtered block data 250. The CDEF filter 215 can remove ringing and basis noise around sharp edges in the DB-filtered block data 245. In some examples, the CDEF filter 215 can be a direction filter that follow edges based on direction of the edges. In some examples, CDEF filter 215 can operate in 8 different directions. A graphic representing the CDEF filter 215 in FIG. 2 illustrates example block edges oriented according to each of the 8 different directions.

In some examples, the CDEF filter 215 filters based on the following equation:

$$y(i, j) = x(i, j) + \sum_{m=-2 \text{ to } 2} \sum_{n=-2 \text{ to } 2} x(i+m, j+n) * (\text{pri\_dir}(i, j) + \text{sec\_dir}(i, j))$$

According to this equation for the CDEF filter 215, filtering the first block using the CDEF filter 215 uses at least two lines (e.g., rows or columns) of DB-filtered pixel data from a neighboring block (e.g., line 705 and 710 in FIG. 7), in addition to the DB-filtered block data 245 from the first block. In some examples, the neighboring block line buffer may store DB-filtered pixel data from at least the two lines of the neighboring block as the DB-filtered neighboring block data 235, which may be retrieved by the decoder system 200 for use by the CDEF filter 215 in filtering the DB-filtered block data 245 to generate the CDEF-filtered block data 250.

The decoder system 200 passes the CDEF-filtered block data 250 generated using the CDEF filter 215 to the upscaler 220 to generate upscaled CDEF-filtered block data 255 using the upscaler 220. The upscaler 220 upscales the CDEF-filtered block data 250 by an upscaling factor to generate the upscaled CDEF-filtered block data 255. In an illustrative example, the upscaling factor is 2. In some examples, the upscaling factor can be 2, 3, 4, or another appropriate upscaling factor. A graphic representing the upscaler 220 in FIG. 2 illustrates upscaling of a block by a factor of 2. The upscaler 220 and/or the upscaler 230 can use any upscaling technique(s), such as upscaling, upsampling, resampling, resizing, nearest-neighbor interpolation, bilinear interpolation, bicubic interpolation, sinc resampling, Lanczos resampling, box sampling, mipmapping, interpolation based on Fourier transform(s), edge-directed interpolation, high-quality scaling (HQX), vectorization, super-resolution, deep convolutional neural network(s), or a combination thereof.

The decoder system 200 passes the upscaled CDEF-filtered block data 255 to a loop restoration (LR) filter 225. The decoder system 200 also retrieves the upscaled DB-filtered neighboring block data 240 from the neighboring block line buffer 205, and passes the upscaled DB-filtered neighboring block data 240 to the LR filter 225. The decoder system 200 uses the LR filter 225 to filter the upscaled CDEF-filtered block data 255 to generate the output block data 260. To filter the upscaled CDEF-filtered block data 255 using the LR filter 225, the decoder system 200 can also use the upscaled DB-filtered neighboring block data 240 as well as the CDEF-filtered block data 255 as inputs to the LR filter 225 to generate the output block data 260. The LR filter 225 can include one or more configurable filters and/or switchable filters, such as one or more Wiener filters and/or one or more self-guided filters. In some examples, the LR filter 225, and/or the filter(s) that the LR filter 225 includes, include one or more convolving filters that are configured to build a kernel to restore lost quality of the input data (e.g., the upscaled CDEF-filtered block data 255). In some examples, the LR filter 225 is used for denoising and/or edge enhancement, for instance to remove DCT basis noise using configurable amount(s) of blurring. A graphic representing the LR filter 225 in FIG. 2 illustrates exemplary removal (e.g., smoothing) of noise.

In some examples, the LR filter 225 filters based on the following equations:

$$y'(i, j) = \sum_{m=-3 \text{ to } 3} \text{horz\_coeff} * x(i+m, j)$$

$$y(i, j) = \sum_{n=-3 \text{ to } 3} \text{vert\_coeff} * y'(i, j+n)$$

According to these equations for the LR filter 225, filtering the first block using the LR filter 225 uses at least three lines (e.g., rows or columns) of DB-filtered pixel data from a neighboring block (e.g., line 705 and 710 in FIG. 7) that has been upscaled (e.g., using the upscaler 230), in addition to the upscaled CDEF-filtered block data 255 from the first block. In some examples, the neighboring block line buffer may store DB-filtered pixel data from at least three lines of the neighboring block, upscaled using the upscaler 230, as the upscaled DB-filtered neighboring block data 240. In such examples, the upscaled DB-filtered neighboring block data 240 may be retrieved by the decoder system 200 for use by the LR filter 225 in filtering the upscaled CDEF-filtered block data 255 to generate the output block data 260.

The neighboring block line buffer 205 may store DB-filtered pixel data from at least two lines of the neighboring block, upscaled using the upscaler 230, as the upscaled DB-filtered neighboring block data 240. In such examples, the upscaled DB-filtered neighboring block data 240 may be retrieved by the decoder system 200, which may duplicate one or more lines of the upscaled DB-filtered neighboring block data 240 to simulate a third line of pixel data having been present in the DB-filtered neighboring block data 235 before it was upscaled by the upscaler 230 to generate the upscaled DB-filtered neighboring block data 240 (e.g., see the duplication 720 of line 710 to generate line 715). After duplication of line(s), the upscaled DB-filtered neighboring block data 240 may be provided by the decoder system 200 as an input to the LR filter 225 in filtering the upscaled CDEF-filtered block data 255 to generate the output block data 260. In some examples, the decoder system 200 may duplicate one line of the upscaled DB-filtered neighboring block data 240 (e.g., regardless of upscaling). In some examples, if the upscaling factor of the upscaler 230 is 2, then the decoder system 200 may duplicate two lines of the upscaled DB-filtered neighboring block data 240 before using the upscaled DB-filtered neighboring block data 240 with the duplicated lines with the LR filter 225 in filtering the upscaled CDEF-filtered block data 255 to generate the output block data 260. This line duplication can reduce how much data (e.g., from the DB-filtered neighboring block data 235 and the upscaled DB-filtered neighboring block data 240) is stored in the neighboring block line buffer 205 by a factor of one-third.

In some examples, the decoder system 200 can pass the output of the LR filter 225 (e.g., the output block data 260) back to the DB filter 210 for another loop through the DB filter 210, the CDEF filter 215, the upscaler 220, the LR filter 225, the upscaler 230, and/or the neighboring block line buffer 205. In this way, the output block data 260 can be used as at least a portion of the input video data 270 (e.g., the portion representing the first block). This repetition of this filtering process can be referred to as a coding loop, and is represented in FIG. 2 by a dashed line arrow from the LR filter 225 back to the DB filter 210. In some examples, the output block data 260 may refer to the output of multiple repetitions of the filtering process in the coding loop.

In some examples, at least one of the upscalers (e.g., upscaler 220 and/or upsaler 230) performs horizontal upscaling without vertical upscaling. In some examples, at least one of the upscalers (e.g., upscaler 220 and/or upsaler 230) performs vertical upscaling without horizontal upscaling. In some examples, at least one of the upscalers (e.g., upscaler 220 and/or upsaler 230) performs both horizontal upscaling and vertical upscaling.

In some examples, in a decoder system 200 with 4:2:0 chroma sub-sampling where the neighboring block is located above the first block in the video frame, the amount of data written to, stored in, and read from the neighboring block line buffer 205 (e.g., the DB-filtered neighboring block data 235) in the non-upscaled domain can be determined as follows:

CDEF Luma *nbr* data size:2*Luma_Tile_Width

CDEF *CB nbr* data size:2*Luma_Tile_Width*½

CDEF *CR nbr* data size:2*Luma_Tile_Width*½

In some examples, in the decoder system 200 with 4:2:0 chroma sub-sampling where the neighboring block is located above the first block in the video frame, the amount of data written to, stored in, and read from the neighboring block line buffer 205 (e.g., the upscaled DB-filtered neighboring block data 240) in the upscaled domain can be determined as follows:

LR Luma *nbr* data size:
2*UpscaleRatio*Luma_Tile_Width

LR *CB nbr* data size:
2*UpscaleRatio*Luma_Tile_Width*½

LR *CR nbr* data size:
2*UpscaleRatio*Luma_Tile_Width*½

In some examples, in the decoder system 200 with 4:2:0 chroma sub-sampling where the neighboring block is located above the first block in the video frame, the amount of data written to, stored in, and read from the neighboring block line buffer 205 (e.g., the DB-filtered neighboring block data 235 and the upscaled DB-filtered neighboring block data 240) in total can be determined as follows:

Total *nbr* data size:
(4*UpscaleRatio*Luma_Tile_Width)+(4*Luma_Tile_Width)

In some examples, for a video frame configured for providing the upscaled DB-Filtered neighboring block data 240 to the LR filter 225, and having no vertical tiles, tile width is equal to frame width. For frame width (W) and an upscale ratio=2, the amount of data written to, stored in, and read from the neighboring block line buffer 205 (e.g., the DB-filtered neighboring block data 235 and the upscaled DB-filtered neighboring block data 240) can be determined as follows:

Total *nbr* data size:(4*2*$W$)+(4*$W$)pixels=12*$W$ pixels

In some examples, for frame rate (F frames per sec), minimum read/write memory bandwidth for writing data to and/or reading data from the neighboring block line buffer 205 is:

Memory Bandwidth=12*$W$*$F$ pixels/sec

Figure 3:
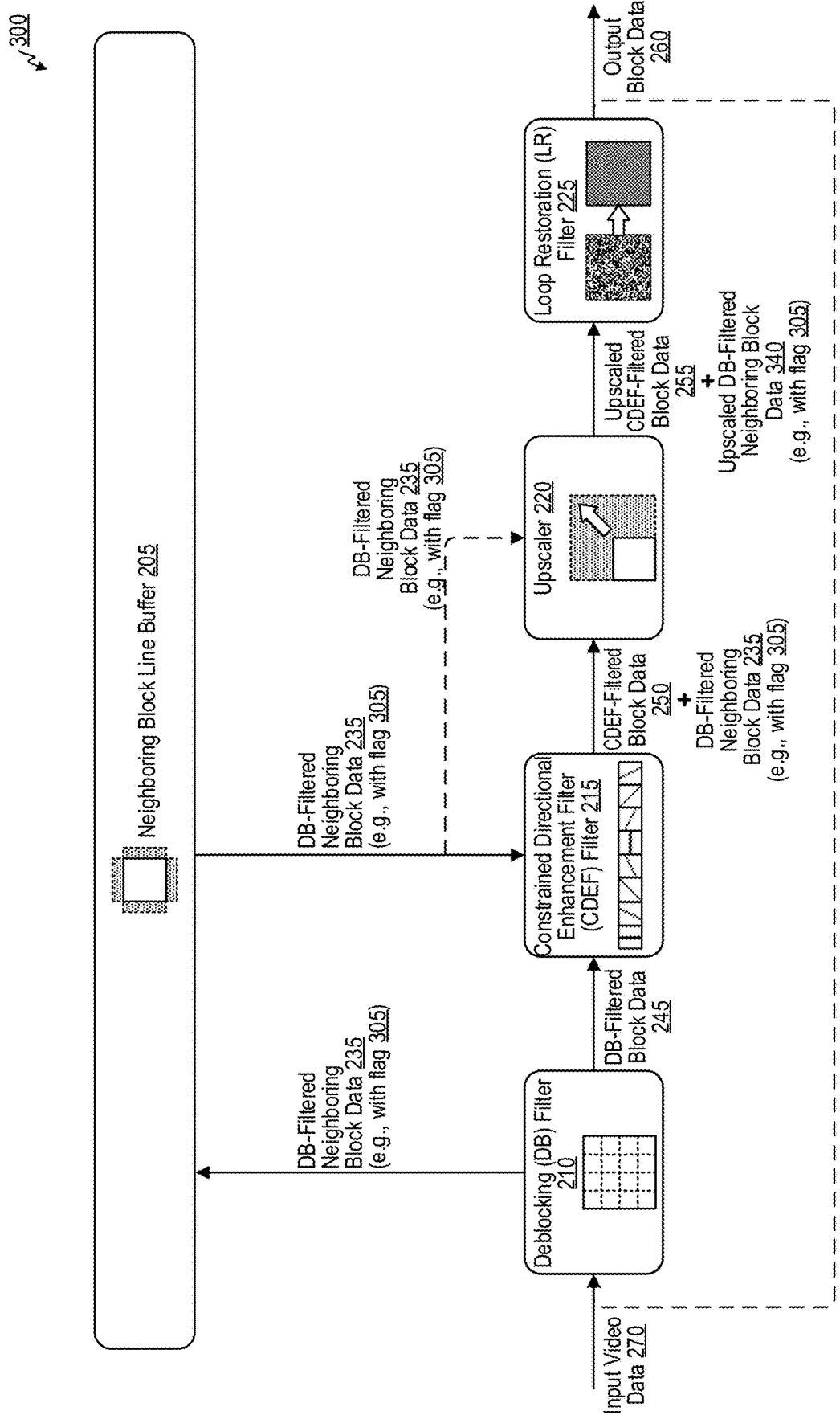
FIG. 3 is a block diagram illustrating a decoder system that includes one upscaler and that stores deblocking (DB) filtered neighboring block data in a neighboring block line buffer, in accordance with some examples.

FIG. 3 is a block diagram illustrating a decoder system 300 that includes one upscaler 220 and that stores deblocking (DB) filtered neighboring block data 235 in a neighboring block line buffer 205. Similarly to the decoder system 200 of FIG. 2, the decoder system 300 of FIG. 3 includes the DB filter 210, the CDEF filter 215, the upscaler 220, and the LR filter 225. At least some of these elements of the decoder system 300 of FIG. 3 can function as described with respect to the decoder system 200 of FIG. 2. For instance, similarly to the decoder system 200, the decoder system 300 receives input video data 270, inputs the input video data 270 into the DB filter 210, outputs DB-filtered block data 245 from the DB filter 210 to input into the CDEF filter 215, and outputs DB-filtered neighboring block data 235 from the DB filter 210 to store in the neighboring block line buffer 205.

Unlike the decoder system 200 of FIG. 2, the decoder system 300 of FIG. 3 includes a single upscaler (e.g., upscaler 220) rather than two separate upscalers (e.g., upscaler 220 and upscaler 230). This aspect of the decoder system 300 can provide several technical improvements over the decoder system 200. For instance, hardware for the decoder system 300 can be physically smaller than the hardware for the decoder system 200, since the upscaler 230 is not needed in the decoder system 300. The decoder system 300 can use less power than the decoder system 200 for corresponding decoding operations, since power does not need to be provided to the upscaler 230 in the decoder system 300. In some examples, the removal of the upscaler 230 can provide an 8,000 square micrometer ($\mu m^2$) reduction in size for the decoder system 300 on a circuit board compared to the decoder system 200 on a circuit board.

Unlike the decoder system 200 of FIG. 2, the decoder system 300 of FIG. 3 stores the DB-filtered neighboring block data 235 in the neighboring block line buffer 205 without storing upscaled DB-filtered neighboring block data 240 in the neighboring block line buffer 205. This aspect of the decoder system 300 can provide several technical improvements over the decoder system 200. In some examples, the decoder system 300 writes less data to, stores less data in, and retrieves less data from, the neighbor block line buffer 205, compared to the decoder system 200. In some examples, use of the vertical raster scanning order 435 and/or the vertical raster scanning order 530 further allows the decoder system 300 to write less data to, store less data in, and retrieve less data from, the neighbor block line buffer 205, compared to the decoder system 200. For instance, examples of the decoder system 300 can achieve a 66.67% memory savings over examples of the decoder system 200, for instance by reducing the size of data written to, stored in, and read from the neighbor block line buffer 205 from 12×8192×10 bits (122.88 kilobytes (KB)) to 4×8192×10 bits (40.96 KB), given a maximum tile width of 8192 bits and an upscaling ratio of 2. This allows the decoder system 300 to use a smaller neighboring block line buffer 205 than the decoder system 200.

The decoder system 300 reduces the minimum reading and writing bandwidth for reading from and writing to the neighboring block line buffer 205 in the decoder system 300, compared to the decoder system 200. In some examples, use of the vertical raster scanning order 435 and/or the vertical raster scanning order 530 can also reduce the minimum reading and writing bandwidth for reading from and writing to the neighboring block line buffer 205 in the decoder system 300, compared to the decoder system 200. In some examples, the DB-filtered neighboring block data 235 stored in the neighboring block line buffer 205 by the decoder system 300 includes 4×W pixels, wherein W is a tile width corresponding to at least one tile of the video frame. In some examples, a memory bandwidth of the neighboring block line buffer 205 of the decoder system 300 is 4×W×F pixels per second, wherein W is a tile width corresponding to at least one tile of the video frame, wherein F is a frame rate associated with a video, wherein the video includes the video frame. For instance, examples of the decoder system 300 can achieve a 66.67% reduction in the amount of reading and writing bandwidth used for reading from and writing to the neighboring block line buffer 205 in examples of the decoder system 300 compared to examples of the decoder system 200, for instance by reducing the minimum reading and writing bandwidth used from 12×8192×60×10 bits/sec (7.3728 megabytes per second (MBps)) to 4×8192× 60×10 bits/sec (2.4576 MBps), given a maximum tile width of 8192 bits, a frame rate of 60 frames per second, and an upscaling ratio of 2. This allows the decoder system 300 to use components and structures (e.g., memory units of the neighboring block line buffer 205, connections to and from the neighboring block line buffer 205) that have a lower bandwidth than corresponding components in the decoder system 200. Use of lower-bandwidth components in the decoder system 300 can draw less power than use of higher-bandwidth components in the decoder system 200.

The decoder system 300 can also save power over the decoder system 200 by writing less data to, and reading less data from, the neighboring block line buffer 205.

Similarly to the decoder system 200 of FIG. 2, the decoder system 300 of FIG. 3 can filter the DB-filtered block data 245 using the CDEF filter 215 to generate CDEF-filtered block data 250. To filter the DB-filtered block data 245 using the CDEF filter 215, the decoder system 200 can also retrieve the DB-filtered neighboring block data 235 from the neighboring block line buffer 205, and use the DB-filtered neighboring block data 235 as well as the DB-filtered block data 245 as inputs to the CDEF filter 215 to generate the CDEF-filtered block data 250. The CDEF filter 215 of the decoder system 300 can generate the CDEF-filtered block data 250 as discussed with respect to the CDEF filter 215 of the decoder system 200. In some examples, the CDEF filter 215 of the decoder system 300 of FIG. 3 can also output the DB-filtered neighboring block data 235 in addition to the CDEF-filtered block data 250. In such examples, the decoder system 300 can pass both the DB-filtered neighboring block data 235 and the CDEF-filtered block data 250 from the CDEF filter 215 to the upscaler 220. In some examples, the decoder system 300 can pass the DB-filtered neighboring block data 235 to the upscaler 220 from the neighboring block line buffer 205, as indicated using the dashed arrow from the neighboring block line buffer 205 to the upscaler 220.

The decoder system 300 passes the CDEF-filtered block data 250 and the DB-filtered neighboring block data 235 output by the CDEF filter 215 to the upscaler 220 to generate upscaled CDEF-filtered block data 255 and upscaled DB-filtered neighboring block data 340 using the upscaler 220. In some examples, the upscaled DB-filtered neighboring block data 340 is similar to the upscaled DB-filtered neighboring block data 240, but upscaled by the upscaler 220 rather than the upscaler 230. The upscaler 220 upscales the CDEF-filtered block data 250 and the DB-filtered neighboring block data 235 by an upscaling factor to generate the upscaled CDEF-filtered block data 255 and the upscaled DB-filtered neighboring block data 340, respectively. In an illustrative example, the upscaling factor is 2. In some examples, the upscaling factor can be 2, 3, 4, or another appropriate upscaling factor.

The decoder system 300 passes the upscaled CDEF-filtered block data 255 and the upscaled DB-filtered neighboring block data 340 to the LR filter 225. Rather than retrieving upscaled DB-filtered neighboring block data 240 from the neighboring block line buffer 205 as in the decoder system 200, the decoder system 300 instead receives the upscaled DB-filtered neighboring block data 340 from the upscaler 220, and passes the upscaled DB-filtered neighboring block data 340 to the LR filter 225. The decoder system 300 uses the LR filter 225 to filter the upscaled CDEF-filtered block data 255 to generate the output block data 260. To filter the upscaled CDEF-filtered block data 255 using the LR filter 225, the decoder system 300 can also use the upscaled DB-filtered neighboring block data 340 as well as the CDEF-filtered block data 255 as inputs to the LR filter 225 to generate the output block data 260.

In some examples, the decoder system 300 sets a first indication for the first block data and a second indication for the neighboring block data. In some examples, the decoder system 300 can set the first indication for the first block data and the second indication for the neighboring block data while both the first block data and the neighboring block data are part of the input video data 270, before the input video data 270 is received by the DB filter 210. In some examples, the decoder system 300 can set the first indication for the first block data and the second indication for the neighboring block data using an element of the DB filter 210. The first indication and the second indication can be maintained and/or retained throughout filtering using the DB filter 210, filtering using the CDEF filter 215, upscaling using the upscaler 220, and/or filtering using the LR filter 225. The decoder system 300 can then identify which data belongs to the first block (e.g., the DB-filtered block data 245, the CDEF-filtered block data 250, the upscaled CDEF-filtered block data 255, and/or at least a subset of the output block data 260 corresponding to the first block) and which data belongs to the neighboring block (e.g., the DB-filtered neighboring data 235, the upscaled DB-filtered neighboring data 340, and/or at least a subset of the output block data 260 corresponding to the neighboring block) at any point in the decoding process that is performed by the decoder system 300 and that is illustrated in FIG. 3. For instance, the decoder system 300 can identify a first subset of the output video data corresponding to the first block that is configured to be displayed as part of a decoded video.

In some examples, the decoder system 300 sets the first indication for the first block data and the second indication for the neighboring block data using one or more flags. For example, the decoder system 300 can set a flag 305 variable to one of two binary values (0, 1) to represent the first indication and the second indication, respectively. For instance, in some examples, the decoder system 300 can set the first indication for the first block data by applying the flag 305 with a first value to the data for the first block, and the decoder system 300 can set the second indication for the neighboring block data by applying the flag 305 with a second value to the data for the neighboring block. In some examples, one of the two indications (e.g., the first indication and the second indication) can be the presence of a flag 305, while the other of the two indications can be the lack of a flag 305. Thus, in some examples, the decoder system 300 can set the first indication for the first block data by applying the flag 305 to the data for the first block, and the decoder system 300 can set the second indication for the neighboring block data by not applying the flag 305 to the data for the neighboring block. In some examples, the decoder system 300 can set the first indication for the first block data by not applying the flag 305 to the data for the first block, and the decoder system 300 can set the second indication for the neighboring block data by applying the flag 305 the data for the neighboring block.

In some examples, the decoder system 300 can pass the output of the LR filter 225 (e.g., the output block data 260) back to the DB filter 210 for another loop through the DB filter 210, the CDEF filter 215, the upscaler 220, the LR filter 225, and/or the neighboring block line buffer 205. In this way, the output block data 260 can be used as at least a portion of the input video data 270 (e.g., the portion representing the first block). This repetition of this filtering process can be referred to as a coding loop, and is represented in FIG. 3 by a dashed line arrow from the LR filter 225 back to the DB filter 210. In some examples, the output block data 260 may refer to the output of multiple repetitions of the filtering process in the coding loop.

The decoder system 300 can output the output block data 260 for storage in at least one memory unit. The decoder system 300 can output the output block data 260 to a display, causing the display to display the output block data 260 as part of the video frame, for instance during playback of the video that includes the video frame using the display. The decoder system 300 can output the output block data 260 by transmitting the output block data 260 to a recipient device, for instance using a communication interface 960, in some examples causing the recipient device to display the output block data 260 as part of the video frame, for instance during playback of the video that includes the video frame using a display of the recipient device.

FIG. 4 is a conceptual diagram 400 illustrating reading, processing, and/or outputting pixel data from a superblock and a neighboring block according to a vertical raster scanning order 435. The illustrated super block has a super block height 405 of 64 pixels and a super block width 410 of 64 pixels. Because $64^2=4096$, the super block includes 4096 total pixels. The super block is divided into 256 blocks 425, with each block of the blocks 425 having dimensions of 4 pixels by 4 pixels. The blocks 425 of the super block are each illustrated in white, with a black outline. While the example of FIG. 4 illustrates a super block having a dimension of 64 pixels by 64 pixels, it should be understood that super blocks can have other sizes, such as 16 pixels by 16 pixels, 32 pixels by 32 pixels, 128 pixels by 128 pixels, 256 pixels by 256 pixels, 512 pixels by 512 pixels, 1024 pixels by 1024 pixels, 2048 pixels by 2048 pixels, or other such dimensions. Furthermore, while the example of FIG. 4 illustrates the blocks 425 as having a dimension of 4 pixels by 4 pixels, it should be understood that the blocks 425 can have other sizes, such as 1 pixel, 2 pixels by 2 pixels, 3 pixels by 3 pixels, 5 pixels by 5 pixels, 6 pixels by 6 pixels, 7 pixels by 7 pixels, 8 pixels by 8 pixels, 9 pixels by 9 pixels, 10 pixels by 10 pixels, and so forth.

Neighboring block data 420 includes blocks 430 of the neighboring block. The blocks 430 are illustrated as shaded using a pattern of black dots on a white background, with a black outline. The blocks 430 are 4 pixels wide, and 2 pixels tall. The super block boundary 415 is visible as a thick black outline between the blocks 425 of the super block and the blocks 430 of the neighboring block. In some examples, the 4 pixel by 2 pixel blocks 430 of the neighboring block represent portions of 4 pixel by 4 pixel blocks (not pictured) of the neighboring block. while the example of FIG. 4 illustrates the blocks 425 as having a dimension of 4 pixels by 2 pixels, it should be understood that the blocks 430 can have other sizes, such as 1 pixel, 2 pixels by 2 pixels, 3 pixels by 2 pixels, 5 pixels by 2 pixels, 6 pixels by 2 pixels, 7 pixels by 2 pixels, 8 pixels by 2 pixels, 9 pixels by 2 pixels, 10 pixels by 2 pixels, and so forth.

In some examples, use of the vertical raster scanning order 435 (e.g., for reading the input video data 270, filtering using the DB filter 210, filtering using the CDEF filter 215, upscaling using the upscaler 220, filtering using the LR filter 225, any other processing, and/or output) allows the decoder system 300 to write less data to, store less data in, and retrieve less data from, the neighbor block line buffer 205, compared to the decoder system 200 and/or use of a horizontal raster scanning order (e.g., horizontal raster scanning order 510). For instance, because a horizontal raster scanning order scans row by row from top to bottom, using a horizontal raster scanning order may require entire lines (e.g., rows) of pixels of the width of the super block width 410 in the neighboring block data 420 to be written to, stored in, and read from the neighbor block line buffer 205 (e.g., for reading the input video data 270, filtering using the DB filter 210, filtering using the CDEF filter 215, upscaling using the upscaler 220, filtering using the LR filter 225, any other processing, and/or output). In contrast, because the vertical raster scanning order 435 scans column by column from left to right, using a vertical raster scanning order 435 can allow portions of the lines (e.g., rows) of pixels, for example only the portions corresponding to one or more of the blocks 430 of the neighboring block data 420 to be written to, stored in, and read from the neighbor block line buffer 205, without requiring entire lines (e.g., rows) of pixels of the width of the super block width 410 in the neighboring block data 420 to be written to, stored in, and read from the neighbor block line buffer 205. In other words, if the blocks 425 are read in vertical raster scan order 435, the neighboring block line buffer 205 can store portion(s) of the neighboring block data 420 with less than the entire super block width 410 at a time. An example of the portion(s) of the neighboring block data 420 that can be stored in neighboring block line buffer 205 are illustrated outlined using dashed lines. In some examples, use of the vertical raster scanning order 435 with the decoder system 300 may help produce a 66.67% memory savings over examples of the decoder system 200 as discussed above. In some examples, use of the vertical raster scanning order 435 with the decoder system 300 may help produce a 66.67% reduction in the amount of reading and writing bandwidth used for reading from and writing to the neighboring block line buffer 205 in examples of the decoder system 300 compared to examples of the decoder system 200 as discussed above.

FIG. 5A is a conceptual diagram 500 illustrating reading, processing, and/or outputting pixel data from a block according to a horizontal raster scanning order 510. The horizontal raster scanning order 510 may be used by the decoder system 200 and/or the decoder system 300 for reading the input video data 270, filtering using the DB filter 210, filtering using the CDEF filter 215, upscaling using the upscaler 220, filtering using the LR filter 225, upscaling using the upscaler 230, any other processing, and/or output of the output block data 260. The horizontal raster scanning order 510 is illustrated in the conceptual diagram 500 by numbering each of the blocks (e.g., blocks 425) of the superblock from 0 to 255 according to the horizontal raster scanning order 510.

FIG. 5B is a conceptual diagram 520 illustrating reading, processing, and/or outputting pixel data from a block according to a vertical raster scanning order 530. The vertical raster scanning order 530 may be used by the decoder system 200 and/or the decoder system 300 for reading the input video data 270, filtering using the DB filter 210, filtering using the CDEF filter 215, upscaling using the upscaler 220, filtering using the LR filter 225, upscaling using the upscaler 230, any other processing, and/or output of the output block data 260. The vertical raster scanning order 530 is illustrated in the conceptual diagram 500 by numbering each of the blocks (e.g., blocks 425) of the superblock from 0 to 255 according to the vertical raster scanning order 530. Use of the vertical raster scanning order 530 with the decoder system 300 may help provide technical improvements compared to use of the horizontal raster scanning order 510 with the decoder system 200 and/or with the decoder system 300, such as a reduction in the amount of data to be written to, stored in, and/or read from the neighboring block line buffer 205, and/or a reduction in minimum bandwidth used to the write to and/or read from the neighboring block line buffer 205. The vertical raster scanning order 530 may be an example of the vertical raster scanning order 435. The vertical raster scanning order 435 may be an example of the vertical raster scanning order 530.

Figure 6:
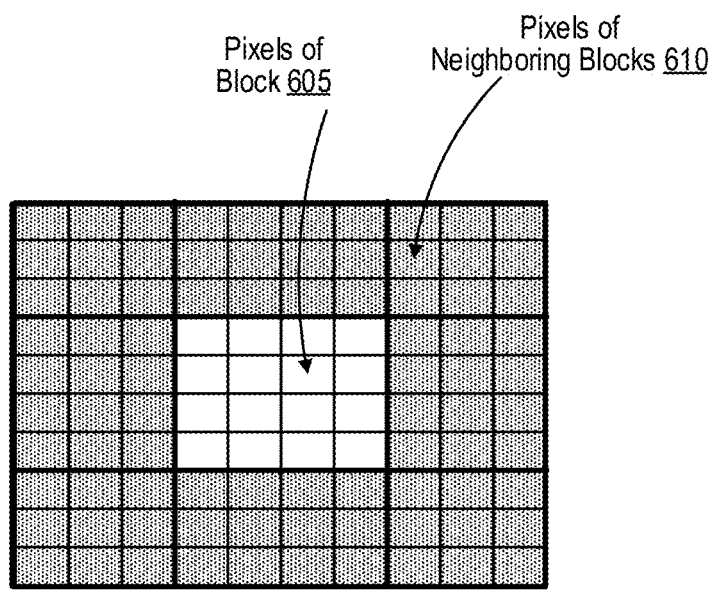
FIG. 6 is a conceptual diagram illustrating pixel data to be used for filtering a block using a loop restoration (LR) filter, in accordance with some examples.

FIG. 6 is a conceptual diagram 600 illustrating pixel data to be used for filtering a block 605 using a loop restoration (LR) filter 225. The block 605 is illustrated as a 4 pixel by 4 pixel block. The LR filter 225 uses the pixel data from the 16 pixels of the block 605 itself, as well as pixels of one or more neighboring blocks 610, in order to filter the pixels of the block 605 using the LR filter 225. The pixels of the block 605 are illustrated as white rectangles with black outlines. The pixels of the one or more neighboring blocks 610 are illustrated as shaded rectangles with black outlines. In some examples, all of the pixels of the one or more neighboring blocks 610 illustrated in the conceptual diagram 600 are used by the LR filter 225 to filter the pixels of the block 605. In some examples, only some of the pixels of the one or more neighboring blocks 610 illustrated in the conceptual diagram 600 are used by the LR filter 225 to filter the pixels of the block 605, such as the pixels of the one or more neighboring blocks 610 that are on one or more specified sides of the block 605. In some examples, the pixel data for the block 605 and the pixel data for the one or more neighboring blocks 610 may be upscaled (e.g., via the upscaler 220 and/or the upscaler 230) before the LR filter 225 is applied, in which case each rectangle in the conceptual diagram 600 can represent an area with multiple pixels, rather than a single pixel. The area can be a 2 pixel by 2 pixel area if the upscaling factor is 2, or a 3 pixel by 3 pixel area if the upscaling factor is 3, and so forth.

Figure 7:
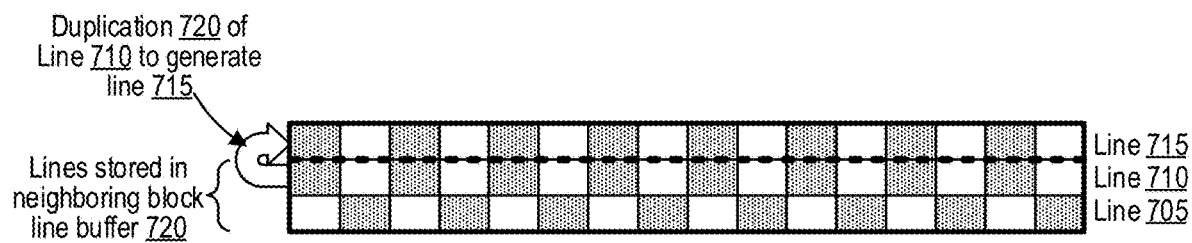
FIG. 7 is a conceptual diagram illustrating duplication of a line of pixels from a neighboring block line buffer to generate an additional line of pixels for use by a loop restoration (LR) filter, in accordance with some examples.

FIG. 7 is a conceptual diagram 700 illustrating duplication 720 of a line 710 of pixels from a neighboring block line buffer 205 to generate an additional line 715 of pixels for use by a loop restoration (LR) filter 225. As indicated previously, in some examples, the LR filter 225 uses pixel data from a specified block, as well as 3 lines of pixels from one or more neighboring blocks that neighbor the specified block, to filter a specified block using the LR filter 225. The line 705, the line 710, and the line 715 can be examples of these 3 lines of pixels from one or more neighboring blocks that are written to, stored in, and read from in the neighboring block line buffer 205 for use by the LR filter 225, and that are used by the LR filter 225. In some examples, the line 705 is the closest line of the 3 lines to the block to be filtered using the LR filter 225, while the line 715 is the farthest line of the 3 lines to the block currently being filtered using the LR filter 225. The line 705, the line 710, and the line 715 can be examples of data in the DB-filtered neighboring block data 235. The lines, with the line 715 generated using the duplication 720, can be referred to as a modified set of lines.

Rather than write, store, and read all 3 lines, the decoder system 300 instead only writes, stores, and reads two lines of pixels from the one or more neighboring blocks, such as line 705 and line 710. The decoder system 300 can perform a duplication 720 of line 710 to generate line 715. In the conceptual diagram 700, each of the 3 lines is illustrated having a pattern of alternating white rectangles and shaded rectangles, representing pixel data in the respective line. In some examples, each white rectangle or shaded rectangle represents one pixel. The pixel data in the line 710 is different than the pixel data in the line 705. The pixel data in the line 715 is different than the pixel data in the line 705. The pixel data in the line 715 matches the pixel data in the line 710, as a result of the duplication 720 of the line 710 by the decoder system 300 to generate the line 715.

One or more of the lines may be horizontally and/or vertically upscaled, for instance using the upscaler 220 and/or the upscaler 230. In such examples, each of the white rectangles and/or shaded rectangles in the conceptual diagram can represent more than one pixel, based on the upscaling factor. For instance, if the lines are upscaled vertically and horizontally (e.g., using the upscaler 220 and/or the upscaler 230) according to an upsaling factor of 2, then each of the white rectangles and/or shaded rectangles can represent an area of 2 pixels by 2 pixels. The line 705, the line 710, and the line 715 can be examples of data in the upscaled DB-filtered neighboring block data 240, and/or of data in the upscaled DB-filtered neighboring block data 340.

Use of the duplication 720 with the decoder system 300 may help provide technical improvements compared to storing all 3 lines, such as a reduction in the amount of data to be written to, stored in, and/or read from the neighboring block line buffer 205, and/or a reduction in minimum bandwidth used to the write to and/or read from the neighboring block line buffer 205.

Figure 8:
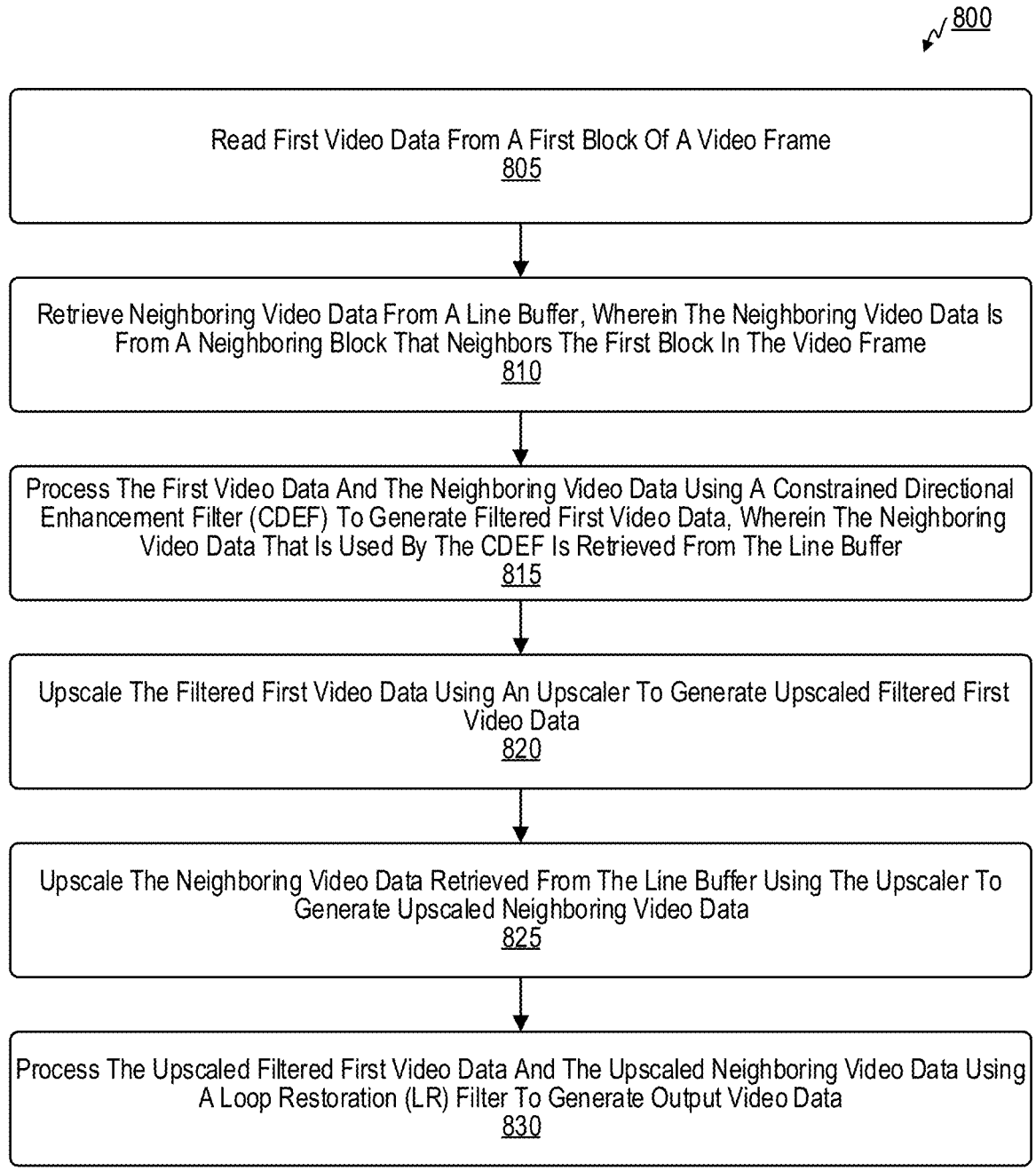
FIG. 8 is a flow diagram illustrating a codec process, in accordance with some examples.

FIG. 8 is a flow diagram illustrating a codec process 800. The codec process 800 may be performed by a codec system. In some examples, the codec system can include, for example, the video source 102, the encoding device 104, the encoding engine 106, the storage 108, the output 110, the communications link 120, the decoding device 112, the input 114, the decoder engine 116, the storage 118, the video destination device 122, the decoder system 200, the neighboring block line buffer 205, the DB filter 210, the CDEF filter 215, the upscaler 220, the LR filter 225, the upscaler 230, the decoder system 300, the computing system 900, the processor 910, an apparatus, a non-transitory computer-readable medium that stores instructions for execution by one or more processors, a mobile handset, a head-mounted display (HMD), a wireless communication device, or a combination thereof.

At operation 805, the codec system is configured to, and can, read first video data from a first block of a video frame. Examples of the first video data from the first block of the video frame include the output 110, the input 114, the input video data 270, the DB-filtered block data 245, the blocks 425 of the super block with the super block boundary 415, the block in the conceptual diagram 500, the block in the conceptual diagram 520, the pixels of the block 605, or a combination thereof. The first block may be an example of the blocks and/or super blocks discussed herein. For instance, the first block may be an example of the super block of FIG. 4.

At operation 810, the codec system is configured to, and can, retrieve neighboring video data from a line buffer. The neighboring video data is from a neighboring block that neighbors the first block in the video frame. An example of the line buffer is the neighboring block line buffer 205. Examples of the neighboring video data includes neighboring video data in the output 110, neighboring video data in the input 114, neighboring video data in the input video data 270, the DB-filtered neighboring block data 235, the neighboring block data 420 (or at least portion thereof that is in the neighboring block line buffer 205), the pixels of the neighboring blocks 610, line 705, line 710, line 715, or a combination thereof. Examples of the neighboring block include the neighboring blocks 610, which each neighbor the block 605.

In some examples, the codec system receives the first video data and/or the neighboring video data from an image sensor, such as the image sensor 130 or an image sensor of an input device 945. In some examples, the codec system includes the image sensor. In some examples, the codec system includes an image sensor connector that couples and/or connects the image sensor to a remainder of the codec system (e.g., including the processor and/or the memory of the codec system). In some examples, the codec system receives the first video data and/or the neighboring video data from the image sensor by receiving the image data from, over, and/or using the image sensor connector.

In some aspects, the first video data and/or the neighboring video data are encoded using a video encoder before the first video data is read and the neighboring video data is retrieved. Examples of the video encoder include the encoding device 104 and/or the encoding engine 106.

In some aspects, the codec system is configured to, and can, filter the first video data using a de-blocking (DB) filter (e.g., DB filter 210) to read the first video data, and/or prior to reading the first video data. For instance, the DB-filtered block data 245 may be an example of the first video data read in operation 805. In some aspects, the neighboring video data is filtered using the DB filter prior to retrieval of the neighboring video data from the line buffer. For instance, the DB-filtered neighboring block data 235 may be an example of the neighboring video data retrieved in operation 810.

In some aspects, before retrieving the neighboring video data from the line buffer in operation 810, the codec system is configured to, and can, read the neighboring video data from the neighboring block of the video frame and store the neighboring video data in the line buffer. In some aspects, before storing the neighboring video data in the line buffer, the codec system is configured to, and can, filter the first video data and the neighboring video data using a DB filter (e.g., DB filter 210). In other words, before retrieving the neighboring video data from the line buffer in operation 810, the codec system can, read the neighboring video data from the neighboring block of the video frame, filter the neighboring video data using the DB filter (e.g., DB filter 210), and store the neighboring video data in the line buffer.

In some aspects, the neighboring video data is non-upscaled as retrieved from the line buffer and/or as stored in the line buffer. In such aspects, the neighboring video data stored in the line buffer and/or retrieved from the line buffer may be an example of the DB-filtered neighboring block data 235, not the upscaled DB-filtered neighboring block data 240.

In some aspects, reading the first video data and retrieving the neighboring video data includes reading the first video data and retrieving the neighboring video data in vertical raster scan order, such as the vertical raster scan order 435 and/or the vertical raster scan order 530. In some aspects, the neighboring video data that is retrieved from the line buffer includes a portion of one or more lines of pixels that corresponds to one or more columns along vertical raster scan order, and a width of the portion of the one or more lines of pixels is less than an entire width of the first block. For instance, in the context of FIG. 4, if the blocks 425 and the neighboring block data 420 are read in vertical raster scan order 435, the neighboring block line buffer 205 can store portion(s) (e.g., one or more blocks 430 and/or portions thereof) of the neighboring block data 420 with less than the entire super block width 410 at a time. In some aspects, reading the first video data and retrieving the neighboring video data includes reading the first video data and retrieving the neighboring video data in horizontal raster scan order, such as the horizontal raster scan order 510.

At operation 815, the codec system is configured to, and can, process the first video data and the neighboring video data using a constrained directional enhancement filter (CDEF) to generate filtered first video data. The neighboring video data that is used by the CDEF is retrieved from the line buffer. An example of the CDEF is the CDEF 215. An example of the filtered first video data is the CDEF-filtered block data 250.

At operation 820, the codec system is configured to, and can, upscale the filtered first video data using an upscaler to generate upscaled filtered first video data. An example of the upscaler includes the upscaler 220. An example of the upscaled filtered first video data includes the upscaled CDEF-filtered block data 255.

At operation 825, the codec system is configured to, and can, upscale the neighboring video data retrieved from the line buffer using the upscaler to generate upscaled neighboring video data. An example of the upscaler includes the upscaler 220. An example of the upscaled neighboring video data includes the upscaled DB-filtered neighboring block data 340. In some aspects, the neighboring video data is upscaled after generating the filtered first video data. In some aspects, the upscaler receives the neighboring video data from the line buffer (e.g., from the neighboring block line buffer 205). In some aspects, the upscaler receives the neighboring video data from the CDEF (e.g., from the CDEF 215), which in turn receives the neighboring video data from the line buffer (e.g., from the neighboring block line buffer 205).

At operation 830, the codec system is configured to, and can, process the upscaled filtered first video data and the upscaled neighboring video data using a loop restoration (LR) filter to generate output video data. An example of the LR filter includes the LR filter 225. An example of the output video data includes the output block data 260.

The DB filter (e.g., DB filter 210), the CDEF (e.g., the CDEF filter 215), the upscaler (e.g., the upscaler 220), the LR filter (e.g., the LR filter 225), and/or the line buffer (e.g., the neighboring block line buffer 205) may be referred to as a coding loop. In some aspects, the codec system is configured to, and can, run the output block data 260 back through another pass of at least a portion of the coding loop.

In some aspects, the codec system is configured to, and can, set an indication for the first video data. The indication is retained by the codec system during processing using the CDEF and the upscaler, and therefore is retained in the filtered first video data, in the upscaled filtered first video data, and in the output video data. The codec system can identify, based on presence of the indication in the output video data, a first subset of the output video data corresponding to the first block and a second subset of the output video data corresponding to the neighboring block. For instance, the codec system can identify that the first subset of the output video data corresponds to the first block because the first subset includes the indicator, and that the second subset of the output video data corresponds to the neighboring block because the second subset is missing the indicator. An example of the indicator includes the first indication, the flag 305, or a variation of the flag 305 applied by the codec system to the first video data (e.g., the input video data 270 and/or the DB-filtered block data 245). In some aspects, at least the first subset of the output video data corresponding to the first block is configured to be displayed as part of a decoded video.

Similarly, the codec system is configured to, and can, set an indication for the neighboring video data. The indication is retained by the codec system during processing using the CDEF and the upscaler, and therefore is retained in the upscaled neighboring video data and in the output video data. The codec system can identify, based on presence of the indication in the output video data, a first subset of the output video data corresponding to the first block and a second subset of the output video data corresponding to the neighboring block. For instance, the codec system can identify that the first subset of the output video data corresponds to the first block because the first subset is missing the indicator, and that the second subset of the output video data corresponds to the neighboring block because the second subset includes the indicator. An example of the indicator includes the second indication, the flag 305, applied by the codec system to the neighboring video data. In some aspects, the codec system can set different indications for the first video data and for the neighboring video data, the indications can be retained through processing (e.g., by the DB filter, the CDEF, the upscaler, and/or the LR filter), and the codec system can identify the first and second subsets based on which indicator is included in each. In some aspects, at least the first subset of the output video data corresponding to the first block is configured to be displayed as part of a decoded video.

In some aspects, the codec system is configured to, and can, duplicate at least one line of pixels in the upscaled neighboring video data to generate modified upscaled neighboring video data, as in the duplication 720 of line 710 to generate line 715. Responsive to generating the modified upscaled neighboring video data, the codec system is configured to, and can, process the upscaled filtered first video data and the upscaled neighboring video data using the LR filter to generate the output video data. This duplication can reduce how much is written to, stored in, and/or retrieved from the line buffer, since a smaller set of neighboring video data can be duplicated to increase the amount of neighboring video data after retrieval from the line buffer, and before or after upscaling.

In some aspects, the neighboring block is located above the first block in the video frame, as illustrated with the neighboring block data 420 being above the super block of FIG. 4.

In some aspects, the neighboring video data includes 4×W pixels, wherein W is a tile width corresponding to at least one tile of the video frame. In some aspects, a memory bandwidth of the line buffer is 4×W×F pixels per second, wherein W is a tile width corresponding to at least one tile of the video frame, wherein F is a frame rate associated with a video, wherein the video includes the video frame.

In some aspects, the CDEF, the upscaler, and the LR filter are associated with an AOMedia Video 1 (AV1) format, an AV1 codec, an AV1 decoder, or a combination thereof.

In some aspects, the codec system is configured to, and can, output the output video data for storage in at least one memory (e.g., cache 912, memory 915, ROM 920, RAM 925, storage device 930, or a combination thereof). In some aspects, the codec system is configured to, and can, cause output video data to be displayed using a display (e.g., an output device 935). In some aspects, the codec system is configured to, and can, cause the output video data to be transmitted to a recipient device (e.g., a computing system 900) using a communication interface (e.g., a communication interface 940).

In some examples, the imaging system can includes: means for reading first video data from a first block of a video frame; means for retrieving neighboring video data from a line buffer, wherein the neighboring video data is from a neighboring block that neighbors the first block in the video frame; means for processing the first video data and the neighboring video data using a constrained directional enhancement filter (CDEF) to generate filtered first video data, wherein the neighboring video data that is used by the CDEF is retrieved from the line buffer; means for upscaling the filtered first video data using an upscaler to generate upscaled filtered first video data; means for upscaling the neighboring video data retrieved from the line buffer using the upscaler to generate upscaled neighboring video data; and means for processing the upscaled filtered first video data and the upscaled neighboring video data using a loop restoration (LR) filter to generate output video data.

In some examples, the means for reading the first video data includes the encoding device 104, the output 110, the decoding device 112, the input 114, the decoder engine 116, the decoder system 200, the DB filter 210, the decoder system 300, the computing system 900, or a combination thereof.

In some examples, the means for retrieving the neighboring video data includes the encoding device 104, the output 110, the decoding device 112, the input 114, the decoder engine 116, the decoder system 200, the neighboring block line buffer 205, the DB filter 210, the decoder system 300, the computing system 900, or a combination thereof.

In some examples, the means for processing the first video data and the neighboring video data using the CDEF includes the decoding device 112, the decoder engine 116, the decoder system 200, the neighboring block line buffer 205, the CDEF 215, the decoder system 300, the computing system 900, or a combination thereof.

In some examples, the means for upscaling the filtered first video data and upscaling the neighboring video data includes the decoding device 112, the decoder engine 116, the decoder system 200, the neighboring block line buffer 205, the upscaler 220, the decoder system 300, the computing system 900, or a combination thereof.

In some examples, the means for processing the upscaled filtered first video data and the upscaled neighboring video data using the LR filter includes the decoding device 112, the decoder engine 116, the decoder system 200, the neighboring block line buffer 205, the LR filter 225, the decoder system 300, the computing system 900, or a combination thereof.

In some examples, the processes described herein (e.g., the respective processes of FIGS. 1, 2, 3, 4, 5A, 5B, 6, 7, the process 800 of FIG. 8, and/or other processes described herein) may be performed by a computing device or apparatus. In some examples, the processes described herein can be performed by, and/or using, the video source 102, the encoding device 104, the encoding engine 106, the storage 108, the output 110, the communications link 120, the decoding device 112, the input 114, the decoder engine 116, the storage 118, the video destination device 122, the decoder system 200, the decoder system 300, the neighboring block line buffer, the DB filter 210, the CDEF filter 215, the upscaler 220, the LR filter 225, the upscaler 230, the codec system that performs the codec process 800, the computing system 900, the processor 910, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. In some examples, performance of certain operations described herein can be responsive to performance of other operations described herein.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
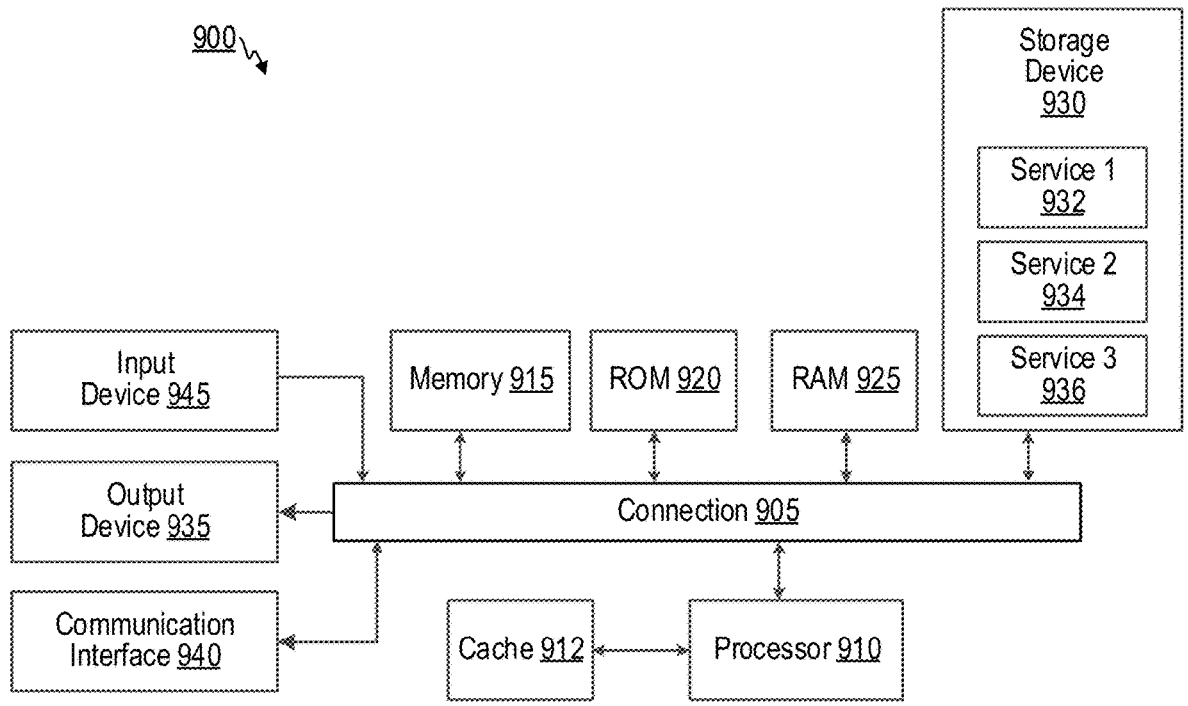
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905.

Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: read first video data from a first block of a video frame; retrieve neighboring video data from a line buffer, wherein the neighboring video data is from a neighboring block that neighbors the first block in the video frame; process the first video data and the neighboring video data using a constrained directional enhancement filter (CDEF) to generate filtered first video data, wherein the neighboring video data that is used by the CDEF is retrieved from the line buffer; upscale the filtered first video data using an upscaler to generate upscaled filtered first video data; upscale the neighboring video data retrieved from the line buffer using the upscaler to generate upscaled neighboring video data; and process the upscaled filtered first video data and the upscaled neighboring video data using a loop restoration (LR) filter to generate output video data.

Aspect 2. The apparatus of Aspect 1, wherein the neighboring video data is upscaled after generating the filtered first video data.

Aspect 3. The apparatus of any of Aspects 1 to 2, wherein the at least one processor is configured to: filter the first video data using a de-blocking (DB) filter to read the first video data, wherein the neighboring video data is filtered using the DB filter prior to retrieval of the neighboring video data from the line buffer.

Aspect 4. The apparatus of any of Aspects 1 to 3, wherein the at least one processor is configured to: before retrieving the neighboring video data from the line buffer, read the neighboring video data from the neighboring block of the video frame; and before retrieving the neighboring video data from the line buffer, store the neighboring video data in the line buffer.

Aspect 5. The apparatus of Aspect 4, wherein the at least one processor is configured to: before storing the neighboring video data in the line buffer, filter the first video data and the neighboring video data using a de-blocking (DB) filter.

Aspect 6. The apparatus of any of Aspects 1 to 5, wherein the neighboring video data is non-upscaled as retrieved from the line buffer.

Aspect 7. The apparatus of any of Aspects 1 to 6, wherein reading the first video data and retrieving the neighboring video data includes reading the first video data and retrieving the neighboring video data in vertical raster scan order.

Aspect 8. The apparatus of Aspect 7, wherein the neighboring video data that is retrieved from the line buffer includes a portion of one or more lines of pixels that corresponds to one or more columns along vertical raster scan order, wherein a width of the portion of the one or more lines of pixels is less than an entire width of the first block.

Aspect 9. The apparatus of any of Aspects 1 to 8, wherein the at least one processor is configured to: set an indication for the first video data, wherein the indication is retained in the filtered first video data, the upscaled filtered first video data, and the output video data; and identify, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

Aspect 10. The apparatus of any of Aspects 1 to 9, wherein the at least one processor is configured to: set an indication for the neighboring video data, wherein the indication is retained during processing using the CDEF, in the upscaled neighboring video data, and in the output video data; and identify, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

Aspect 11. The apparatus of any of Aspects 1 to 10, wherein the at least one processor is configured to: duplicate at least one line of pixels in the upscaled neighboring video data to generate modified upscaled neighboring video data; and responsive to generating the modified upscaled neighboring video data, process the upscaled filtered first video data and the upscaled neighboring video data using the LR filter to generate the output video data.

Aspect 12. The apparatus of any of Aspects 1 to 11, wherein the neighboring block is located above the first block in the video frame.

Aspect 13. The apparatus of any of Aspects 1 to 12, wherein the neighboring video data includes 4×W pixels, wherein W is a tile width corresponding to at least one tile of the video frame.

Aspect 14. The apparatus of any of Aspects 1 to 13, wherein a memory bandwidth of the line buffer is 4×W×F pixels per second, wherein W is a tile width corresponding to at least one tile of the video frame, wherein F is a frame rate associated with a video, wherein the video includes the video frame.

Aspect 15. The apparatus of any of Aspects 1 to 14, wherein the CDEF, the upscaler, and the LR filter are associated with an AOMedia Video 1 (AV1) format.

Aspect 16. The apparatus of any of Aspects 1 to 15, wherein the at least one processor is configured to: output the output video data for storage in the at least one memory.

Aspect 17. The apparatus of any of Aspects 1 to 16, further comprising: a display configured to display the output video data.

Aspect 18. The apparatus of any of Aspects 1 to 17, further comprising: a communication interface configured to transmit the output video data to a recipient device.

Aspect 19. The apparatus of any of Aspects 1 to 18, further comprising: a video encoder configured to encode the first video data and the neighboring video data before the first video data is read and the neighboring video data is retrieved.

Aspect 20. The apparatus of any of Aspects 1 to 19, wherein the apparatus includes at least one of a head-mounted display (HMD), a mobile handset, or a wireless communication device.

Aspect 21. An method for video decoding, the method comprising: reading first video data from a first block of a video frame; retrieving neighboring video data from a line buffer, wherein the neighboring video data is from a neighboring block that neighbors the first block in the video frame; processing the first video data and the neighboring video data using a constrained directional enhancement filter (CDEF) to generate filtered first video data, wherein the neighboring video data that is used by the CDEF is retrieved from the line buffer; upscaling the filtered first video data using an upscaler to generate upscaled filtered first video data; upscaling the neighboring video data retrieved from the line buffer using the upscaler to generate upscaled neighboring video data; and processing the upscaled filtered first video data and the upscaled neighboring video data using a loop restoration (LR) filter to generate output video data.

Aspect 22. The method of Aspect 21, wherein the neighboring video data is upscaled after generating the filtered first video data.

Aspect 23. The method of any of Aspects 21 to 22, further comprising: filtering the first video data using a de-blocking (DB) filter to read the first video data, wherein the neighboring video data is filtered using the DB filter prior to retrieval of the neighboring video data from the line buffer.

Aspect 24. The method of any of Aspects 21 to 23, further comprising: before retrieving the neighboring video data from the line buffer, reading the neighboring video data from the neighboring block of the video frame; and before retrieving the neighboring video data from the line buffer, storing the neighboring video data in the line buffer.

Aspect 25. The method of Aspect 24, further comprising: before storing the neighboring video data in the line buffer, filtering the first video data and the neighboring video data using a de-blocking (DB) filter.

Aspect 26. The method of any of Aspects 21 to 25, wherein the neighboring video data is non-upscaled as retrieved from the line buffer.

Aspect 27. The method of any of Aspects 21 to 26, wherein reading the first video data and retrieving the neighboring video data includes reading the first video data and retrieving the neighboring video data in vertical raster scan order.

Aspect 28. The method of Aspect 27, wherein the neighboring video data that is retrieved from the line buffer includes a portion of one or more lines of pixels that corresponds to one or more columns along vertical raster scan order, wherein a width of the portion of the one or more lines of pixels is less than an entire width of the first block.

Aspect 29. The method of any of Aspects 21 to 28, further comprising: setting an indication for the first video data, wherein the indication is retained in the filtered first video data, the upscaled filtered first video data, and the output video data; and identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

Aspect 30. The method of any of Aspects 21 to 29, further comprising: setting an indication for the neighboring video data, wherein the indication is retained during processing using the CDEF, in the upscaled neighboring video data, and in the output video data; and identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

Aspect 31. The method of any of Aspects 21 to 30, further comprising: duplicating at least one line of pixels in the upscaled neighboring video data to generate modified upscaled neighboring video data; and responsive to generating the modified upscaled neighboring video data, processing the upscaled filtered first video data and the upscaled neighboring video data using the LR filter to generate the output video data.

Aspect 32. The method of any of Aspects 21 to 31, wherein the neighboring block is located above the first block in the video frame.

Aspect 33. The method of any of Aspects 21 to 32, wherein the neighboring video data includes 4×W pixels, wherein W is a tile width corresponding to at least one tile of the video frame.

Aspect 34. The method of any of Aspects 21 to 33, wherein a memory bandwidth of the line buffer is 4×W×F pixels per second, wherein W is a tile width corresponding to at least one tile of the video frame, wherein F is a frame rate associated with a video, wherein the video includes the video frame.

Aspect 35. The method of any of Aspects 21 to 34, wherein the CDEF, the upscaler, and the LR filter are associated with an AOMedia Video 1 (AV1) format.

Aspect 36. The method of any of Aspects 21 to 35, further comprising: outputting the output video data for storage in at least one memory.

Aspect 37. The method of any of Aspects 21 to 36, further comprising: causing the output video data to be displayed using a display.

Aspect 38. The method of any of Aspects 21 to 37, further comprising: causing the output video data to be transmitted to a recipient device using a communication interface.

Aspect 39. The method of any of Aspects 21 to 38, wherein the first video data and the neighboring video data are encoded using a video encoder before the first video data is read and the neighboring video data is retrieved.

Aspect 40. The method of any of Aspects 21 to 39, wherein the method is performed using an apparatus that includes at least one of a head-mounted display (HMD), a mobile handset, or a wireless communication device.

Aspect 41: A non-transitory computer-readable medium having stored thereon instructions that, when executed by one or more processors, cause the one or more processors to: read first video data from a first block of a video frame; retrieve neighboring video data from a line buffer, wherein the neighboring video data is from a neighboring block that neighbors the first block in the video frame; process the first video data and the neighboring video data using a constrained directional enhancement filter (CDEF) to generate filtered first video data, wherein the neighboring video data that is used by the CDEF is retrieved from the line buffer; upscale the filtered first video data using an upscaler to generate upscaled filtered first video data; upscale the neighboring video data retrieved from the line buffer using the upscaler to generate upscaled neighboring video data; and process the upscaled filtered first video data and the upscaled neighboring video data using a loop restoration (LR) filter to generate output video data.

Aspect 42: The non-transitory computer-readable medium of Aspect 41, further comprising operations according to any of Aspects 2 to 20, and/or any of Aspects 21 to 40.

Aspect 43: An apparatus for image processing, the apparatus comprising: means for reading first video data from a first block of a video frame; means for retrieving neighboring video data from a line buffer, wherein the neighboring video data is from a neighboring block that neighbors the first block in the video frame; means for processing the first video data and the neighboring video data using a constrained directional enhancement filter (CDEF) to generate filtered first video data, wherein the neighboring video data that is used by the CDEF is retrieved from the line buffer; means for upscaling the filtered first video data using an upscaler to generate upscaled filtered first video data; means for upscaling the neighboring video data retrieved from the line buffer using the upscaler to generate upscaled neighboring video data; and means for processing the upscaled filtered first video data and the upscaled neighboring video data using a loop restoration (LR) filter to generate output video data.

Aspect 44: The apparatus of Aspect 43, further comprising means for performing operations according to any of Aspects 2 to 20, and/or any of Aspects 21 to 40.

What is claimed is:

1. An apparatus for video decoding, the apparatus comprising:
at least one memory; and
at least one processor coupled to the at least one memory, the at least one processor configured to:
read first video data from a first block of a video frame;
retrieve neighboring video data from a line buffer, wherein the neighboring video data is from a neighboring block that neighbors the first block in the video frame;
process the first video data and the neighboring video data using a constrained directional enhancement filter (CDEF) to generate filtered first video data, wherein the neighboring video data that is used by the CDEF is retrieved from the line buffer;
upscale the filtered first video data using an upscaler to generate upscaled filtered first video data;
upscale the neighboring video data retrieved from the line buffer using the upscaler to generate upscaled neighboring video data, wherein the neighboring video data retrieved from the line buffer is separate from the filtered first video data; and
process the upscaled filtered first video data and the upscaled neighboring video data using a loop restoration (LR) filter to generate output video data, wherein the upscaled neighboring video data used by the LR filter is received directly from the upscaler.

2. The apparatus of claim 1, wherein, to upscale the neighboring video data, the at least one processor is further configured to:
upscale the neighboring video data after the generation of the filtered first video data.

3. The apparatus of claim 1, wherein the at least one processor is further configured to:
de-block (DB) filter the first video data before the generation of the filtered first video data.

4. The apparatus of claim 1, wherein the at least one processor is further configured to:
before the retrieval of the neighboring video data from the line buffer, read the neighboring video data from the neighboring block of the video frame; and
before the retrieval of the neighboring video data from the line buffer, store the neighboring video data in the line buffer.

5. The apparatus of claim 4, wherein the at least one processor is further configured to:
before the storage of the neighboring video data in the line buffer, de-block (DB) filter the first video data and the neighboring video data.

6. The apparatus of claim 1, wherein the line buffer does not store the upscaled neighboring video data.

7. The apparatus of claim 1, wherein the reading of the first video data includes reading of the first video data in vertical raster scan order, and wherein the retrieval of the neighboring video data from the line buffer includes retrieval of the neighboring video data from the line buffer in vertical raster scan order.

8. The apparatus of claim 7, wherein the neighboring video data that is retrieved from the line buffer includes a portion of one or more lines of pixels that corresponds to one or more columns as part of the retrieval of the neighboring video data from the line buffer in the vertical raster scan order, wherein a width of the portion of the one or more lines of pixels is less than an entire width of the first block.

9. The apparatus of claim 1, wherein the at least one processor is further configured to:
set an indication for the first video data, wherein the indication is retained in the filtered first video data, the upscaled filtered first video data, and the output video data; and
identify, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

10. The apparatus of claim 1, wherein the at least one processor is further configured to:
set an indication for the neighboring video data, wherein the indication is retained through the CDEF, in the upscaled neighboring video data, and in the output video data; and
identify, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

11. The apparatus of claim 1, wherein the at least one processor is further configured to:
duplicate at least one line of pixels in the upscaled neighboring video data to generate modified upscaled neighboring video data, wherein, to generate the output video data, the at least one processor is configured to process the upscaled filtered first video data and the modified upscaled neighboring video data using the LR filter.

12. The apparatus of claim 1, wherein the neighboring block is located above the first block in the video frame.

13. The apparatus of claim 1, wherein the neighboring video data includes 4×W pixels, wherein W is a tile width corresponding to at least one tile of the video frame.

14. The apparatus of claim 1, wherein a memory bandwidth of the line buffer is 4×W×F pixels per second, wherein W is a tile width corresponding to at least one tile of the video frame, wherein F is a frame rate associated with a video, wherein the video includes the video frame.

15. The apparatus of claim 1, wherein the CDEF, the upscaler, and the LR filter are associated with an AOMedia Video 1 (AV1) format.

16. The apparatus of claim 1, wherein the at least one processor is further configured to:
output the output video data for storage in the at least one memory.

17. The apparatus of claim 1, further comprising:
a display configured to display the output video data.

18. The apparatus of claim 1, further comprising:
a communication interface configured to transmit the output video data to a recipient device.

19. The apparatus of claim 1, further comprising:
a video encoder configured to encode the first video data and the neighboring video data before the first video data is read and the neighboring video data is retrieved.

20. The apparatus of claim 1, wherein the apparatus includes at least one of a head-mounted display (HMD), a mobile handset, or a wireless communication device.

21. A method for video decoding, the method comprising:
reading first video data from a first block of a video frame;
retrieving neighboring video data from a line buffer, wherein the neighboring video data is from a neighboring block that neighbors the first block in the video frame;
processing the first video data and the neighboring video data using a constrained directional enhancement filter (CDEF) to generate filtered first video data, wherein the neighboring video data that is used by the CDEF is retrieved from the line buffer;
upscaling the filtered first video data using an upscaler to generate upscaled filtered first video data;
upscaling the neighboring video data retrieved from the line buffer using the upscaler to generate upscaled neighboring video data, wherein the neighboring video data retrieved from the line buffer is separate from the filtered first video data; and
processing the upscaled filtered first video data and the upscaled neighboring video data using a loop restoration (LR) filter to generate output video data, wherein the upscaled neighboring video data used by the LR filter is received directly from the upscaler.

22. The method of claim 21, wherein upscaling the neighboring video data includes upscaling the neighboring video data after the generation of the filtered first video data.

23. The method of claim 21, further comprising:
de-block (DB) filtering the first video data before the generation of the filtered first video data.

24. The method of claim 21, further comprising:
before the retrieval of the neighboring video data from the line buffer, reading the neighboring video data from the neighboring block of the video frame; and
before the retrieval of the neighboring video data from the line buffer, storing the neighboring video data in the line buffer.

25. The method of claim 21, wherein the line buffer does not store the upscaled neighboring video data.

26. The method of claim 21, wherein the reading of the first video data includes reading of the first video data in vertical raster scan order, and wherein the retrieval of the neighboring video data from the line buffer includes retrieval of the neighboring video data from the line buffer in vertical raster scan order.

27. The method of claim 21, further comprising:
setting an indication for the first video data, wherein the indication is retained in the filtered first video data, the upscaled filtered first video data, and the output video data; and
identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

28. The method of claim 21, further comprising:
setting an indication for the neighboring video data, wherein the indication is retained through the CDEF, in the upscaled neighboring video data, and in the output video data; and
identifying, based on presence of the indication in the output video data, a first subset of the output video data corresponding to the first block and a second subset of the output video data corresponding to the neighboring block, wherein the first subset of the output video data corresponding to the first block is configured to be displayed as part of a decoded video.

29. The method of claim 21, further comprising:
duplicating at least one line of pixels in the upscaled neighboring video data to generate modified upscaled neighboring video data, wherein the generation of the output video data includes processing the upscaled filtered first video data and the modified upscaled neighboring video data using the LR filter.

30. The method of claim 21, wherein the neighboring block is located above the first block in the video frame.

31. The apparatus of claim 1, wherein the at least one processor is further configured to:
- before the retrieval of the neighboring video data from the line buffer, store the neighboring video data in the line buffer, wherein the neighboring video data is not upscaled as stored in the line buffer, and wherein, to upscale the neighboring video data retrieved from the line buffer using the upscaler, the at least one processor is configured to upscale the neighboring video data retrieved from the line buffer using the upscaler after storing the neighboring video data in the line buffer.

* * * * *